United States Patent
Enomura et al.

(10) Patent No.: US 10,882,109 B2
(45) Date of Patent: Jan. 5, 2021

(54) SILICON COMPOUND-COATED METAL PARTICLES

(71) Applicant: M. TECHNIQUE CO., LTD., Izumi-shi, Osaka (JP)

(72) Inventors: Masakazu Enomura, Izumi (JP); Daisuke Honda, Izumi (JP)

(73) Assignee: M. TECHINQUE CO., LTD., Izumi (JP)

(*) Notice: Subject to any disclaimer, the term of this patent is extended or adjusted under 35 U.S.C. 154(b) by 40 days.

(21) Appl. No.: 16/306,242

(22) PCT Filed: Jun. 1, 2017

(86) PCT No.: PCT/JP2017/020494
§ 371 (c)(1),
(2) Date: Nov. 30, 2018

(87) PCT Pub. No.: WO2017/209256
PCT Pub. Date: Dec. 7, 2017

(65) Prior Publication Data
US 2019/0217384 A1 Jul. 18, 2019

(30) Foreign Application Priority Data

Jun. 2, 2016 (JP) .................................. 2016-111346
Jun. 3, 2016 (WO) .................. PCT/JP2016/066542
Nov. 7, 2016 (WO) .................. PCT/JP2016/083001

(51) Int. Cl.
*B22F 1/00* (2006.01)
*C09C 3/12* (2006.01)
(Continued)

(52) U.S. Cl.
CPC .......... *B22F 1/0062* (2013.01); *B22F 1/0018* (2013.01); *C01B 13/14* (2013.01);
(Continued)

(58) Field of Classification Search
CPC .................................................. B22F 1/0062
See application file for complete search history.

(56) References Cited

U.S. PATENT DOCUMENTS 4,729,785 A 3/1988 Schwab et al.
6,235,270 B1 5/2001 Ishii et al.
(Continued)

FOREIGN PATENT DOCUMENTS

JP 59-31004 A 2/1984
JP 60-135506 A 7/1985
(Continued)

OTHER PUBLICATIONS

Boies et al., "SiO$_2$ coating of silver nanoparticles by photoinduced chemical vapor deposition," Nanotechnology, vol. 20, Jul. 1, 2009, pp. 1-8.
(Continued)

*Primary Examiner* — Alexandre F Ferre
(74) *Attorney, Agent, or Firm* — Birch, Stewart, Kolasch & Birch, LLP

(57) ABSTRACT

The present invention relates to silicon-compound-coated fine metal particles, with which surfaces of fine metal particles, composed of at least one type of metal element or metalloid element, are at least partially coated with a silicon compound and a ratio of Si—OH bonds contained in the silicon-compound-coated fine metal particles is controlled to be 0.1% or more and 70% or less. By the present invention, silicon-compound-coated fine metal particles that are controlled in dispersibility and other properties can be provided by controlling the ratio of Si—OH bonds or the ratio of Si—OH bonds/Si—O bonds contained in the silicon-compound-coated fine metal particles. By controlling the ratio of Si—OH bonds or the ratio of Si—OH bonds/Si—O bonds, a composition that is more appropriate for diversifying applications and targeted properties of silicon-compound-coated fine metal particles than was conventionally possible can be designed easily.

13 Claims, 8 Drawing Sheets

(51) Int. Cl.
*C01G 49/06* (2006.01)
*C01G 9/02* (2006.01)
*C09C 1/24* (2006.01)
*C01B 33/02* (2006.01)
*C01B 33/32* (2006.01)
*C01G 53/00* (2006.01)
*C09C 3/06* (2006.01)
*C01B 13/14* (2006.01)
*C01F 17/206* (2020.01)
*C01G 49/02* (2006.01)
*C09D 7/62* (2018.01)
*C09C 1/04* (2006.01)
*C01G 23/04* (2006.01)

(52) U.S. Cl.
CPC ............ *C01B 13/145* (2013.01); *C01B 33/02* (2013.01); *C01B 33/325* (2013.01); *C01F 17/206* (2020.01); *C01G 9/02* (2013.01); *C01G 49/02* (2013.01); *C01G 49/06* (2013.01); *C01G 53/006* (2013.01); *C09C 1/043* (2013.01); *C09C 1/24* (2013.01); *C09C 3/06* (2013.01); *C09C 3/063* (2013.01); *C09C 3/12* (2013.01); *C09D 7/62* (2018.01); *B22F 2301/10* (2013.01); *B22F 2301/15* (2013.01); *B22F 2301/255* (2013.01); *B22F 2302/256* (2013.01); *B22F 2304/054* (2013.01); *B22F 2304/056* (2013.01); *C01G 23/04* (2013.01); *C01P 2002/01* (2013.01); *C01P 2002/02* (2013.01); *C01P 2002/70* (2013.01); *C01P 2002/72* (2013.01); *C01P 2002/82* (2013.01); *C01P 2004/03* (2013.01); *C01P 2004/04* (2013.01); *C01P 2004/50* (2013.01); *C01P 2004/62* (2013.01); *C01P 2004/64* (2013.01); *C01P 2004/80* (2013.01); *C01P 2006/60* (2013.01); *C01P 2006/62* (2013.01); *C01P 2006/66* (2013.01); *C01P 2006/90* (2013.01)

(56) References Cited

U.S. PATENT DOCUMENTS

| | | | |
|---|---|---|---|
| 6,534,044 B1 | 3/2003 | Wada et al. | |
| 7,998,266 B2 * | 8/2011 | Morimitsu | A61K 8/19 106/14.05 |
| 2008/0044679 A1 | 2/2008 | Maeda et al. | |
| 2010/0021712 A1 * | 1/2010 | Katayama | C08K 9/06 428/221 |
| 2010/0133486 A1 | 6/2010 | Takai et al. | |
| 2010/0137131 A1 | 6/2010 | Awazu et al. | |
| 2010/0155310 A1 | 6/2010 | Enomura | |
| 2014/0308158 A1 | 10/2014 | Maekawa et al. | |
| 2017/0213624 A1 | 7/2017 | Ohkoshi et al. | |
| 2017/0226418 A1 | 8/2017 | Otsuka et al. | |

FOREIGN PATENT DOCUMENTS

| | | |
|---|---|---|
| JP | 61-256705 A | 11/1986 |
| JP | 2007-88156 A | 4/2007 |
| JP | 2008-264611 A | 11/2008 |
| JP | 2009-82902 A | 4/2009 |
| JP | 2009-112892 A | 5/2009 |
| JP | 2011-219869 A | 11/2011 |
| WO | WO 98/47476 A1 | 10/1998 |
| WO | WO 00/42112 A1 | 7/2000 |
| WO | WO 2009/008393 A1 | 1/2009 |
| WO | WO 2013/073695 A1 | 5/2013 |
| WO | WO 2016/009926 A1 | 1/2016 |
| WO | WO 2016/060223 A1 | 4/2016 |
| WO | WO 2018/083805 A1 | 5/2018 |

OTHER PUBLICATIONS

Extended European Search Report for European Application No. 17806806.0, dated Dec. 2, 2019.
Fu et al., "Preparation and characteristics of core-shell structure nickel/silica nanoparticles," Colloids and Surfaces A: Physicochem. Eng. Aspects, vol. 262, 2005 pp. 71-75.
Graf et al., "A General Method to Coat Colloidal Particles with Silica," Langmuir, vol. 19, No. 17, 2003 (published online Jul. 11, 2003), pp. 6693-6700.
Niitsoo et al., "Facile synthesis of silver core—silica shell composite nanoparticles," Journal of Colloid and Interface Science, vol. 354, 2011 (published online Nov. 13, 2010), pp. 887-890.
Shiomi et al., "One-pot synthesis of silica-coated copper nanoparticles with high chemical and thermal stability," Journal of Colloid and Interface Science, vol. 460, 2015 (published online Aug. 20, 2015), pp. 47-54.
Wang et al., "Synthesizing and stabilizing copper nanoparticles by coating with a silica layer in aqueous solution." Journal of the Ceramic Society of Japan, vol. 120, No. 6, 2012, pp. 248-250.
International Search Report, issued in PCT/JP2017/020494, dated Jul. 11, 2017.

* cited by examiner

SILICON COMPOUND-COATED METAL PARTICLES

TECHNICAL FIELD

The present invention relates to silicon-compound-coated fine metal particles.

BACKGROUND ART

Fine metal particles are materials that are used in a wide range of applications, including magnetic materials, conductive materials, coloring materials, catalysts, and the like, and especially by making them as fine as 1 μm or less, the metal particles become improved in properties thereof and can become a composition suitable for use as a dispersion or the like. However, in any application, in accompaniment with the properties that are generated or improved as the metal particles are made finer, explosive reaction due to rapid oxidation in the atmosphere, loss of properties anticipated of the fine metal particles due to oxidation, hydroxylation, or the like due to contact with moisture, or so forth becomes more likely to occur at the same time, making it difficult to make maximum use of the properties as fine metal particles.

Although to solve the above problems, it is effective to coat surfaces of the fine metal particles with silica or other silicon compound as described in Patent Literature 1 or Patent Literature 2, with these prior arts, control of coating state is difficult in itself such that an originally-anticipated effect of the fine metal particles is compromised by coating with a silicon compound or silicon-compound-coated fine metal particles that are precisely controlled in properties are not obtained, and factors of properties of fine metal particles coated with a silicon compound were not clear.

Although Patent Literature 3 describes a method for producing coated particles, in which, in order to control conductivity, coverage with respect to particles is controlled by a coating amount of silica on surfaces of the metal particles, the coverage must obviously be increased to increase insulating property and with silicon-compound-coated fine metal particles that are thus treated to be high in coverage, there are such problems as significant decrease in dispersibility in various dispersion media, non-realization of anticipated effects, and so forth, and silicon-compound-coated fine metal particles that are reduced as much as possible in the silica coating amount with respect to fine metal particles are being demanded from industries as well.

In regard to silica coating, Patent Literature 4 describes particles, with which silica-coated metal oxide particles are subject to further surface treatment with a hydrophobicity-imparting material, such as dimethylethoxysilane. However, no disclosure is made whatsoever in regard to silica-coated fine metal particles, and in regard to silica-coated metal oxide particles, the particles are merely treated with a hydrophobicity-imparting material merely to increase dispersibility in an oil-based dispersion medium, such as polyglycerin triisostearate, silicone oil, or squalane, for cosmetic purposes. Also, although it is stated in Patent Literature 4 that a peak seen at 1150 to 1250 $cm^{-1}$ in an infrared absorption spectrum is an absorption due to bending vibration of Si—OH, the peak should usually be assigned to an Si—O bond and the statement that it is due to Si—OH is clearly in error. Also, a ratio of two different peaks in the infrared absorption spectrum stated in Patent Literature 4 clearly has no relationship to properties of silica-coated fine metal particles, and therefore even in Patent Literature 4, influences that a ratio of Si—OH bonds contained in silica-coated metal oxides or a ratio of Si—OH bonds with respect to a ratio of Si—O bonds in the particles has on the properties of the fine particles are not discovered and silicon-compound-coated fine metal particles that are controlled precisely in properties are not obtained.

Also, Patent Literature 5 by the applicant of the present application describes a method for producing uniform metal particles using a method for precipitating various nanoparticles, such as fine metal particles and fine magnetic particles, between processing surfaces that are capable of approaching and separating from each other and rotate relative to each other. However, in Patent Literature 5, although the production of uniform fine metal particles is described, there is no description regarding silicon-compound-coated fine metal particles and obviously there is also no description regarding control of properties of such silicon-compound-coated fine metal particles, especially dispersibility of silicon-compound-coated fine metal particles, by control of Si—O bonds or Si—OH bonds contained in a silicon compound. That is, nothing is indicated regarding control of properties expressed by silicon-compound-coated fine metal particles, and silicon-compound-coated fine metal particles that are precisely controlled in properties were thus demanded.

PRIOR ART LITERATURE

Patent Literature

Patent Literature 1: JP 2008-264611
Patent Literature 2: JP 2007-088156
Patent Literature 3: JP 2011-219869
Patent Literature 4: WO 2000/042112
Patent Literature 5: WO 2009/008393

SUMMARY OF THE INVENTION

Problems to be Solved by the Invention

In light of such circumstances, an object of the present invention is to provide silicon-compound-coated fine metal particles that are controlled in properties. That is, the object is to coat fine metal particles with a silicon compound and control the properties for the purpose of maximally improving the properties that are anticipated of fine metal particles and compensate for such properties. Use is made of the fact that the ratio of Si—OH bonds or the ratio of Si—OH bonds/Si—O bonds inside the silicon compound that is coated changes in accordance with a method for preparing the silicon-compound-coated fine metal particles and environmental changes after preparation. The present inventors have found that the ratio of Si—OH bonds or the ratio of Si—OH bonds/Si—O bonds contained in the silicon-compound-coated fine metal particles is controllable in a specific range and by controlling the ratio of Si—OH bonds or the ratio of Si—OH bonds/Si—O bonds in the specific range, dispersibility and other properties of the silicon-compound-coated fine metal particles can be controlled precisely, and as a result have completed the present invention. Also, in light of the above circumstances, an object of the present invention is to provide various compositions using the silicon-compound-coated fine metal particles that precisely controlled in properties.

Solution to the Problem

More specifically, the present invention is silicon-compound-coated fine metal particles, with which surfaces of fine metal particles, composed of at least one type of metal element or metalloid element, are at least partially coated with a silicon compound and a ratio of Si—OH bonds contained in the silicon-compound-coated fine metal particles is controlled to be 0.1% or more and 70% or less.

Also, the present invention is silicon-compound-coated fine metal particles, with which surfaces of fine metal particles, composed of at least one type of metal element or metalloid element, are at least partially coated with a silicon compound, and a ratio of Si—OH bonds/Si—O bonds that is a ratio of Si—OH bonds with respect to a ratio of Si—O bonds contained in the silicon-compound-coated fine metal particles is controlled to be 0.001 or more and 700 or less.

In the present invention, preferably, the ratio of Si—OH bonds or the ratio of Si—OH bonds/Si—O bonds contained in the silicon-compound-coated fine metal particles is controlled by a functional group changing treatment.

In the present invention, preferably, the functional group changing treatment is at least one type of reaction selected from among a substitution reaction, an addition reaction, an elimination reaction, a dehydration reaction, a condensation reaction, a reduction reaction, and an oxidation reaction.

In the present invention, preferably, the silicon-compound-coated fine metal particles are those with which surfaces of single metal particles are at least partially coated with the silicon compound, a primary particle diameter of the fine metal particles is 1 μm or less, and a primary particle diameter of the silicon-compound-coated fine metal particles is 100.5% or more and 190% or less of the primary particle diameter of the fine metal particles.

In the present invention, preferably, the silicon-compound-coated fine metal particles are core-shell type silicon-compound-coated fine metal particles, with each of which an entire surface of a single fine metal particle serving as a core is coated with the silicon compound serving as a shell.

In the present invention, preferably, the silicon-compound-coated fine metal particles are those with which surfaces of aggregates, each formed by aggregation of a plurality of fine metal particles, are at least partially coated with the silicon compound, a diameter of the aggregates is 1 μm or less, and a particle diameter of the silicon-compound-coated fine metal particles is 100.5% or more and 190% or less of the diameter of the aggregates.

In the present invention, preferably, the metal element or metalloid element includes at least one type of element selected from a group consisting of silver, copper, and nickel.

In the present invention, preferably, the ratio of Si—OH bonds or the ratio of Si—OH bonds/Si—O bonds is that obtained by waveform separation of peaks in a wavenumber region of 750 $cm^{-1}$ to 1300 $cm^{-1}$ in an infrared absorption spectrum of the silicon-compound-coated fine metal particles measured using an attenuated total reflection method (ATR method).

In the present invention, preferably, the Si—OH bonds are attributed to a peak of greatest area ratio among Si—OH-bond-derived peaks, obtained by waveform separation of peaks in a wavenumber region of 750 $cm^{-1}$ to 1300 $cm^{-1}$ in an infrared absorption spectrum of the silicon-compound-coated fine metal particles measured using an attenuated total reflection method (ATR method) and waveform-separated in a wavenumber region of 850 $cm^{-1}$ to 980 $cm^{-1}$, and the ratio of Si—OH bonds is a ratio of an area of the peak attributed to the Si—OH bonds with respect to a total area of peaks obtained by waveform separation of peaks in the wavenumber region of 750 $cm^{-1}$ to 1300 $cm^{-1}$.

In the present invention, preferably, the Si—O bonds are attributed to a peak of greatest area ratio among Si—O-bond-derived peaks, obtained by waveform separation of peaks in a wavenumber region of 750 $cm^{-1}$ to 1300 $cm^{-1}$ in an infrared absorption spectrum of the silicon-compound-coated fine metal particles measured using an attenuated total reflection method (ATR method) and waveform-separated in a wavenumber region of 1000 $cm^{-1}$ or more and 1300 $cm^{-1}$ or less, the Si—OH bonds are attributed to a peak of greatest area ratio among Si—OH-bond-derived peaks, obtained by waveform separation of peaks in the wavenumber region of 750 $cm^{-1}$ to 1300 cm in the infrared absorption spectrum of the silicon-compound-coated fine metal particles measured using the attenuated total reflection method (ATR method) and waveform-separated in a wavenumber region of 850 $cm^{-1}$ to 980 $cm^{-1}$, and the ratio of Si—OH bonds/Si—O bonds is a ratio of an area of the peak attributed to the Si—OH bonds with respect to an area of the peaks attributed to the Si—O bonds.

In the present invention, preferably, the silicon-compound-coated fine metal particles are those obtained by the fine metal particles being precipitated and the silicon compound being coated on the surfaces of the fine metal particles continuously subsequent to the precipitation between processing surfaces that are capable of approaching and separating from each other and rotate relative to each other.

In the present invention, preferably, the silicon-compound-coated fine metal particles are silicon-compound-coated fine metal particles, with which silicon is contained in interiors of the fine metal particles at least before a heat treatment is applied and, by application of the heat treatment, the silicon is migrated from the interior toward an outer circumference of each fine metal particle in comparison to before application of the heat treatment.

In the present invention, preferably, dispersibility of the silicon-compound-coated fine metal particles in a solvent is controlled by the ratio of the Si—OH bonds being controlled to be 0.1% or more and 70% or less or the ratio of Si—OH bonds/Si—O bonds being controlled to be 0.001 or more and 700 or less.

Also, the present invention may be embodied as a coating composition, a composition for transparent material, a magnetic composition, a conductive composition, a coloring composition, a reaction composition, or a catalyst composition that contains the silicon-compound-coated fine metal particles of the present invention.

Advantageous Effects of the Invention

According to the present invention, silicon-compound-coated fine metal particles that are controlled in dispersibility and other properties can be provided by controlling a ratio of Si—OH bonds or a ratio of Si—OH bonds/Si—O bonds contained in the silicon-compound-coated fine metal particles. By controlling the ratio of Si—OH bonds or the ratio of Si—OH bonds/Si—O bonds, a composition that is more appropriate for diversifying applications and targeted properties of silicon-compound-coated fine metal particles than was conventionally possible can be designed easily.

EMBODIMENTS TO CARRY OUT THE INVENTION

Figure 1:
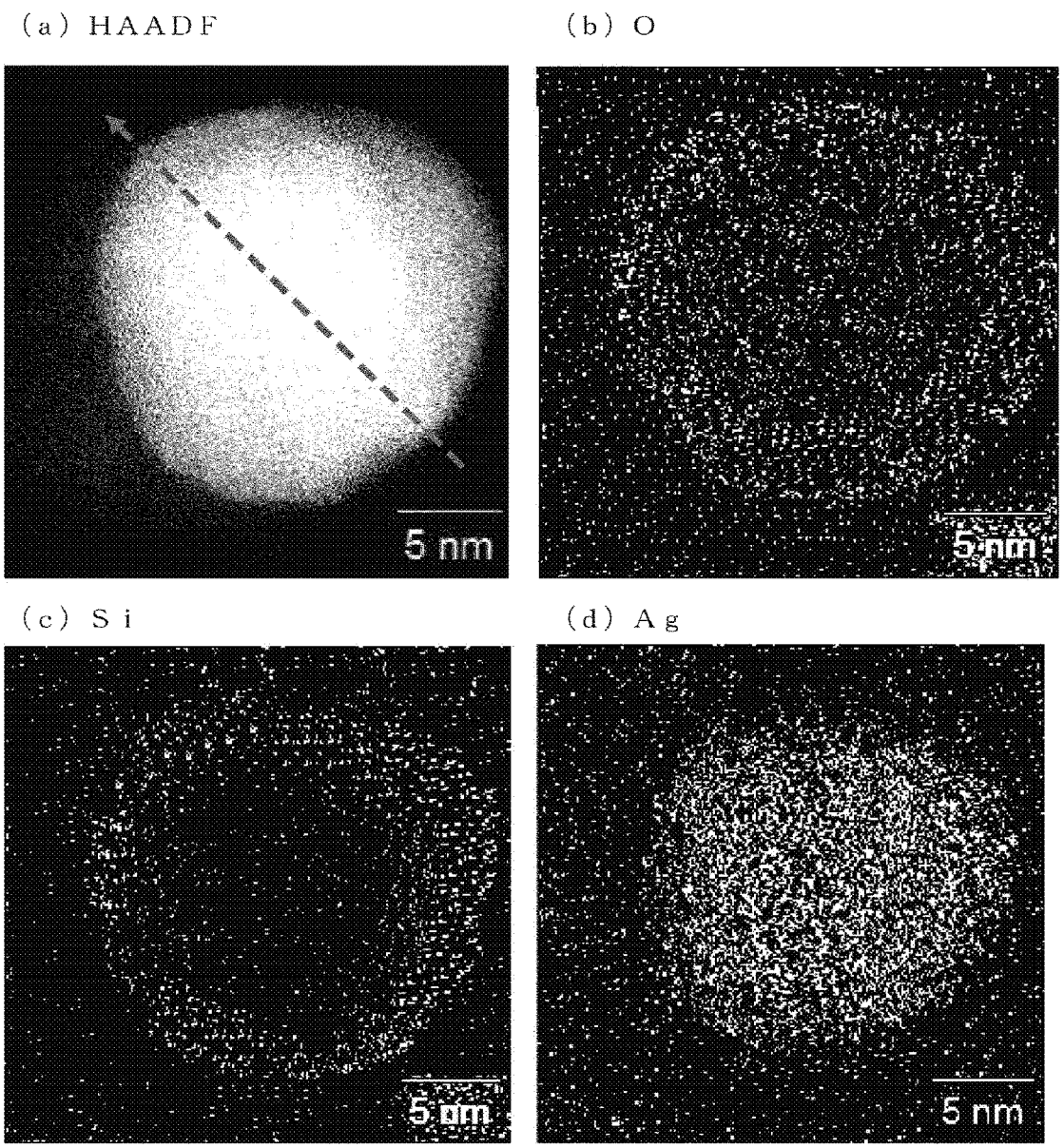
FIG. 1 is a diagram illustrating STEM mapping results of a silicon-compound-coated fine silver particle obtained in Example 1-1.

Hereinafter, the present invention will be described by way of exemplary embodiments with reference to the attached drawings. However, the aspects of the present invention are not limited to the embodiments described below.

(Silicon-Compound-Coated Fine Metal Particle Composition—1)

Silicon-compound-coated fine metal particles according to the present invention are silicon-compound-coated fine metal particles that are controlled in dispersibility and other properties by controlling a ratio of Si—OH bonds or a ratio of Si—OH bonds/Si—O bonds contained in the silicon-compound-coated fine metal particles. The silicon-compound-coated fine metal particles according to the present invention are especially suitable for a coating composition, used for a purpose of coating onto a coating film or a coated body, a composition for transparent material, used for a purpose of kneading into or coating onto a transparent agent, such as a glass, film, or transparent film, a magnetic composition, used for a purpose of adding to a magnetic fluid, a magnetic material, or the like, a conductive composition, used for a purpose of adding to an electronic material, a semiconductor material, or the like, a coloring composition, used for a purpose of coloring a coating film, a coated body, a transparent agent, or the like, or a reaction composition or a catalyst composition, used as a material for any of various chemical reactions.

(Silicon-Compound-Coated Fine Metal Particle Composition—2)

The silicon-compound-coated fine metal particles according to the present invention are silicon-compound-coated fine metal particles, with which the ratio of Si—OH bonds contained in the silicon-compound-coated fine metal particles is controlled to be in a range of 0.1% or more and 70% or less or especially with which the ratio of Si—OH bonds/Si—O bonds is controlled to be in a range of 0.001 or more and 700 or less. Dispersibility can thereby be controlled precisely with respect to a hydrophilic or lipophilic dispersion medium in a case of use in any of the various compositions mentioned above. For example, by using the silicon-compound-coated fine metal particles, with which the ratio of Si—OH bonds or the ratio of Si—OH bonds/Si—O bonds contained in the silicon-compound-coated fine metal particles is controlled with respect to octanol/water partition coefficients of different dispersion media, properties required of the silicon-compound-coated fine metal particles can be exhibited sufficiently in use as an intended composition because the dispersibility with respect to the dispersion medium is controlled precisely. The present inventors have found that despite such control being difficult when the ratio of Si—OH bonds or the ratio of Si—OH bonds/Si—O bonds contained in the silicon-compound-coated fine metal particles is outside the corresponding range mentioned above, such control can be performed extremely easily when either ratio is within the corresponding range. Usually with a coated silicon compound, in order to obtain a satisfactory dispersion state, various functional groups are treated in accordance with a dispersion medium used, and the functional groups are selected according to whether the dispersion medium is an aqueous dispersion medium or a non-aqueous dispersion medium. Although silicon compounds added with various functional groups, for example, phenolic hydroxyl groups, carboxylic groups, carbonyl groups, amino groups, nitro groups, sulfo groups, alkyl groups, and the like, are used, as particle diameter decreases, degradation of dispersion state occurs due to accompaniment of aggregation and it was difficult to achieve the purpose merely by the selection of the functional groups. Under such circumstances, it was found that even in a state where various functional groups are selected, targeted dispersion states could be obtained by controlling the ratio of Si—OH bonds/Si—O bonds and the present invention was thereby completed. That is, information on various bonds are obtained by an FT-IR spectrum and especially among such information, ratios of areas of peaks attributed to Si—OH bonds and Si—O bonds, obtained by waveform-separation of peaks in a wavenumber region of 750 cm$^{-1}$ to 1300 cm$^{-1}$, can be controlled to realize the targeted dispersion states. It was found that suitable use in any of the various compositions mentioned above is made possible because silicon-compound-coated metal particles that are precisely controlled in dispersibility with respect to various solvents can be produced and because properties, such as stability of the silicon-compound-coated fine metal particles per se and preservation stability in a powder state, can be controlled.

(Silicon-Compound-Coated Fine Metal Particle Composition—3)

With the silicon-compound-coated fine metal particles according to the present invention, by the ratio of Si—OH bonds contained in the silicon-compound-coated fine metal particles being controlled to be in the range of 0.1% or more and 70% or less or the ratio of Si—OH bonds/Si—O bonds being controlled to be in the range of 0.001 or more and 700 or less, properties, other than the dispersibility and stabilities mentioned above, such as absorption properties, transmission properties, reflection properties, plasmon properties, and the like with respect to ultraviolet rays, visible rays, near-infrared rays, and other electromagnetic waves are also controlled to enable suitable use in a transparent agent composition, for a purpose of use with a glass, film, transparent resin or the like or a coating composition for a coating film or a coated body. Also, in a case where silicon-compound-coated fine metal particles, with which surfaces of fine metal particles, composed of at least one type of metal element or metalloid element, are coated with a silicon compound, are used as a magnetic composition, the particles are formed as nano-size magnetic domains insulated by the silicon compound and therefore control with magnetic anisotropies being isolated is enabled and consequently, control of holding force is enabled as well. That is, the particles are as suitable as a magnetic composition as never before. The particles are also suitable as an internal electrode of an electronic component. For example, in a case of use in an internal electrode of a laminated ceramic capacitor, a dispersion is processed into a laminated coating film and thereafter baked in a reducing atmosphere and in the process of baking, the silicon compound migrates to a surface layer of the electrode and becomes formed as a thin insulating film at a boundary between an electrode layer and a dielectric layer to greatly improve performance of the laminated ceramic capacitor. Also, in both the case of using the silicon-compound-coated fine metal particles as the magnetic composition and in the case of using the particles as the internal electrode material, slurrying is an important factor and slurrying in a dispersed state without aggregation in an appropriate dispersion medium is essential, and the ratio of Si—OH bonds/Si—O binds influences coating film formation states and states after baking according to baking conditions. Si—O bonds are significant in water-repellent or lipophilic tendency, Si—OH bonds are significant in hydrophilic tendency, and the ratio of these bonds is indeed a controlling factor in dispersion and is also an important factor in control of progress of water evaporation and reduction as well as control of insulating property even at a baking temperature or under a baking atmosphere.

Further, in a case of silicon-compound-coated fine metal particles with semiconductor properties, the particles are controlled in semiconductor properties, such as conductivity, insulating property, or temperature dependence of such properties, and can therefore be used suitably in a semiconductor composition. Although factors that have made such control possible are not definite, the Si—OH bonds or Si—O bonds contained in particle surfaces respectively have properties of vibrating in response to and thereby absorbing waves of different energies and the present inventors consider that by controlling the ratio of Si—OH bonds or the ratio of Si—OH bonds/Si—O bonds contained in the silicon-compound-coated fine metal particles, it is possible to control the types of different energies that are absorbed by the respective vibrations of the Si—OH bonds or the Si—O bonds. Also, whereas at mutual bonds, such as Si—Si, of the silicon element, which is a metalloid, and at bonds, such as Si-M, of the silicon element (Si) and M, which is another metal element or metalloid element, free electrons may be considered to move freely between atoms, at terminal portions of such bonds, in other words, at particle surfaces, the free electrons may considered to be in an activated state due to being in a state of not having anywhere to move to and may be said to be in a state of being capable of constantly giving rise to new bonds. The present inventors consider that a metal element or a metalloid element, such as silicon, that contains activated electrons give rise to bonds with, for example, oxygen or the like in the surroundings, and a resulting silicon-oxygen bond (Si—O bond) or metal-oxygen bond (M-O bond) reacts further with another element or functional group to change into a bond, such a silicon-oxygen bond (Si—OH bond) or a metal-hydroxyl group bond (M-OH bond), that is most stable under the environment in which the particles are placed. It was thus found that because the Si—O bonds or M-O bonds and the Si—OH bonds or M-OH bonds on the particle surfaces are in equilibrium states, the ratio of Si—OH bonds/Si—O bonds or a ratio of M-OH bonds/M-O bonds can be controlled by treating the particles under a specific environment, and because influences that these ratios have on the properties of the particles become greater as the particles become smaller, the properties of the silicon-compound-coated fine metal particles can be controlled precisely by controlling the ratio of the Si—OH bonds/Si—O bonds precisely.

In a case of using the silicon-compound-coated fine metal particles according to the present invention as a catalyst, suitable use in a catalyst composition is also possible because catalytic ability can also be controlled by controlling a coating state of the silicon-compound-coated fine metal particles other than controlling the dispersibility as mentioned above and also, for example, in a case of use in a liquid, since coverage is controlled by making at least a part of the silicon compound coating the surfaces dissolve during use such that surface-active portions of the fine metal particles that were coated become exposed by dissolution of the silicon compound coating and the catalytic ability of the metal particles thus become exhibited or improved, the catalytic activity in this process can be controlled by controlling the ratio of Si—OH bonds or the ratio of Si—OH bonds/Si—O bonds contained in the silicon-compound-coated fine metal particles to control solubility or dissolution rate of the silicon compound, coating the surfaces of the fine metal particles at least partially, to enable control and improvement of the properties of the catalyst. Similarly, in a case of using the silicon-compound-coated fine metal particles according to the present invention as a reaction material in an oxidizing agent, a reducing agent, or the like, suitable use in a reaction composition is also possible because, by controlling the solubility or the dissolution rate of the silicon compound in the liquid, by which the surfaces of the metal particles in a liquid are coated at least partially, an intended reaction of the metal particles included in the silicon-compound-coated fine metal particles with a reactant can be controlled to enable improvement of reaction product yield and selectivity.

(Configuration of Silicon-Compound-Coated Fine Metal Particles—1)

The silicon-compound-coated fine metal particles according to the present invention are silicon-compound-coated fine metal particles, with which surfaces of fine metal particles are at least partially coated with a silicon compound, and the fine metal particles contain, as the metal, one or plurality of different elements among metal elements and metalloid elements on the periodic table. The metal elements in the present invention are not specifically limited and the metal element Ag, Cu, Fe, Al, or the like can be cited as preferable. Also, the metalloid elements in the present invention are not specifically limited and the metalloid element Si, Ge, As, Sb, Te, Se or the like can be cited as preferable. In regard to the metals and metalloids, the metal particles may be fine metal particles composed of a single metal element or may be fine alloy particles composed of a plurality of metal elements or fine alloy particles containing a metal element and a metalloid element.

(Configuration of Silicon-Compound-Coated Fine Metal Particles—2)

The metal particles in the silicon-compound-coated fine metal particles according to the present invention are not limited to just those composed only of a metal. The present invention can be embodied by including a compound other than a metal to the extent that it does not affect the present invention. For example, the silicon-compound-coated fine metal particles can be embodied as those with which surfaces of fine metal particles or fine alloy particles that contain a compound other than metal are at least partially coated with a silicon compound. Examples of the compound other than a metal include oxides, hydroxides, nitrides, carbides, various salts, such as nitrates, sulfates, and carbonates, hydrates, and organic solvates.

(Configuration of Silicon-Compound-Coated Fine Metal Particles—3)

The silicon-compound-coated fine metal particles of the present invention are silicon-compound-coated fine metal particles, with which the ratio of Si—OH bonds contained in the silicon-compound-coated metal particles or the ratio of Si—OH bonds/Si—O bonds that is the ratio of Si—OH bonds with respect to the Si—O bonds contained in the particles is controlled. The silicon-compound-coated fine metal particles of the present invention thus contain at least silicon (Si) and oxygen (O). As a method for evaluating that silicon (Si) and oxygen (O) are contained, a method, where a transmission electron microscope (TEM) or a scanning transmission electron microscope (STEM) is used to observe a plurality of the particles and an energy dispersive x-ray analysis apparatus (EDS) is used to determine an abundance ratio of silicon with respect to elements other than silicon and presence positions of silicon in each particle, is preferable. As an example, a method for evaluating uniformity by specifying the abundance ratio (molar ratio) of an element other than silicon and silicon contained in a single silicon-compound-coated fine metal particle and calculating an average value and a coefficient of variation of the molar ratio in a plurality of silicon-compound-coated fine metal particles, a method for specifying the presence positions of silicon contained in a silicon-compound-coated fine metal particle by mapping, or the like can be cited. In the present invention, the silicon-compound-coated fine metal particles are preferably those with which silicon and oxygen are detected in vicinities of surface layers of the silicon-compound-coated fine metal particles in STEM mapping or line analysis. By coating the surfaces of fine metal particles with the silicon compound, an advantage of enabling water resistance and chemical stability, such as acid resistance and alkali resistance, to be imparted to the fine metal particles is provided.

(Description of Si—OH Bonds and Si—O Bonds—1)

In the present invention, various properties, such as dispersibility, of the silicon-compound-coated fine metal particles are controlled by controlling the ratio of Si—OH bonds contained in the silicon-compound-coated fine metal particles or the ratio of Si—OH bonds/Si—O bonds that is the ratio of Si—OH bonds with respect to the Si—O bonds contained in the particles. The ratio of the Si—OH bonds or the Si—OH bonds/Si—O bonds can, for example, be determined from FT-IR measurement results. Here, IR is an abbreviation for infrared absorption spectroscopy. (Hereinafter indicated simply as IR measurement.) The ratio of the Si—OH bonds or the Si—OH bonds/Si—O bonds may be measured by a method other than IR measurement and examples of such a method include X-ray photoelectron spectroscopy (XPS), solid state nuclear magnetic resonance (solid NMR), electron energy loss spectroscopy (EELS), and the like.

(Description of Si—OH Bonds and Si—O Bonds—2)

In the present invention, the ratio of Si—OH bonds or the ratio of Si—OH bonds/Si—O bonds contained in the silicon-compound-coated fine metal particles is preferably obtained by waveform separation of peaks in a wavenumber region of 750 cm$^{-1}$ to 1300 cm$^{-1}$ in an infrared absorption spectrum measurement of the silicon-compound-coated fine metal particles, an Si—OH-bond-derived peak is preferably deemed to be a peak attributed to a peak of greatest area ratio among Si—OH-bond-derived peaks, waveform-separated in a wavenumber region of 850 cm$^{-1}$ to 980 cm$^{-1}$, and an Si—O-bond-derived peak is preferably deemed to be a peak attributed to a peak of greatest area ratio among Si—O-bond-derived peaks, waveform-separated in a wavenumber region of 1000 cm$^{-1}$ or more and 1300 cm$^{-1}$ or less. Usually, it is preferable to deem the ratio of Si—OH bonds to be a ratio of an area of the peak attributed to the Si—OH bonds with respect to a total area of peaks obtained by waveform separation of peaks in the wavenumber region of 750 cm$^{-1}$ to 1300 cm$^{-1}$, to deem the ratio of Si—O bonds to be a ratio of an area of the peak attributed to the Si—O bonds with respect to the total area of the peaks, and to calculate the ratio of Si—OH bonds/Si—O bonds from the ratio of Si—OH bonds with respect to the ratio of Si—O bonds obtained by the waveform separation of peaks in the wavenumber region of 750 cm$^{-1}$ to 1300 cm$^{-1}$. That is, control of ratio is performed at least in regard to a bond of a functional group differing from the types of bonds described in Patent Literature 4.

(Description of Amorphous Silicon Compound)

In the present invention, the silicon compound coating the surface of the fine metal particles at least partially preferably contains an amorphous silicon oxide to facilitate the control of the ratio of the Si—OH bonds or the Si—OH bonds/Si—O bonds. A method for evaluating that the silicon compound contains an amorphous silicon oxide is not specifically limited, and a method for evaluating by combining a result that a peak derived from crystalline silica ($SiO_2$) is not seen in XRD measurement with the confirmation of the presence of Si and O by the STEM mapping mentioned above and the confirmation of the presence of a silicon oxide by an infrared absorption spectrum, a method for confirming that a crystal lattice is not observed at portions at which Si and O are detected in TEM observation or STEM observation, or the like can be cited.

(Method for Controlling the Ratio of Si—OH bonds or Si—OH Bonds/Si—O Bonds—1)

In the present invention, although a method for controlling the ratio of the Si—OH bonds or the Si—OH bonds/Si—O bonds is not specifically limited, it is preferable to control the ratio of the Si—OH bonds or the Si—OH bonds/Si—O bonds by a changing treatment of functional groups contained in the silicon-compound-coated fine metal particles. In the functional group changing treatment, the ratio of the Si—OH bonds or the Si—OH bonds/Si—O bonds can be controlled by a method for subjecting the functional groups contained in the silicon-compound-coated fine metal particles to a conventionally known substitution reaction, addition reaction, elimination reaction, dehydration reaction, condensation reaction, reduction reaction, oxidation reaction, or the like. The ratio of the Si—OH bonds or the Si—OH bonds/Si—O bonds may be controlled to increase or may be controlled to decrease by the functional group changing treatment. As an example, a method can be cited where, for example, a carboxylic acid, such as acetic anhydride, is made to act on the Si—OH bonds contained in the silicon-compound-coated fine metal particles to control the ratio of the Si—OH bonds or the Si—OH bonds/Si—O bonds by esterification achieved by a dehydration/condensation reaction, in which OH is eliminated from a carboxyl group (—COOH) and H is eliminated from a hydroxyl group (—OH) of an Si—OH group, and for the esterification, a method for using a dehydrating agent, such as a mixed acid anhydride, an acid hydride, or a carbodiimide, or other method other than the method for using an acid anhydride may be employed. Other than the abovementioned esterification, the ratio of Si—OH bonds or the ratio of Si—OH bonds/Si—O bonds can also be controlled by a method for making an alkyl halide, an aryl halide, or a heteroaryl halide act on the Si—OH group, preferably under the presence of an acid catalyst, to make an ether bond form between Si and a substance, such as the abovementioned alkyl halide, by dehydration, a method for making an isocyanate or a thioisocyanate act on the Si—OH to make a (thio)urethane bond be formed, or the like.

In regard to a substance to be made to act on the Si—OH bonds, a substance, containing a fluorine-containing functional group or a hydrophilic, lipophilic, or other functional group, may be used to control the ratio of Si—OH bonds or the ratio of Si—OH bonds/Si—O bonds contained in the silicon-compound-coated fine metal particles. The present invention is not limited to making another substance or functional group act directly on the Si—OH bonds or the Si—O bonds to form new bonds and, for example, the ratio of Si—OH bonds or the ratio of Si—OH bonds/Si—O bonds can also be controlled by a method for controlling the ratio of Si—OH bonds or the ratio of Si—OH bonds/Si—O bonds by a method for making a carbodiimide act on a carboxylic acid or the like contained in the particles, or a method for making ethylene oxide or the like act on the Si—OH bonds to form bonds, such as Si—O—(CH$_2$)$_2$—OH, or making an epihalohydrin act on the Si—OH bonds, and so forth. Other than the above, the ratio of Si—OH bonds or the ratio of Si—OH bonds/Si—O bonds can also be controlled by a method for making hydrogen peroxide or ozone act on the silicon-compound-coated fine metal particles. It is also possible to control the ratio of Si—OH bonds or the ratio of Si—OH bonds/Si—O bonds by using a formulation of a metal raw material liquid or a metal precipitation solvent for precipitating the silicon-compound-coated fine metal particles or a method for controlling the pH or the like during precipitation of the silicon-compound-coated fine metal particles in a liquid. Also, as an example of the dehydration reaction, the ratio of Si—OH bonds or the ratio of Si—OH bonds/Si—O bonds can be controlled by a method for heat-treating the silicon-compound-coated fine metal particles. For controlling the ratio of Si—OH bonds or the ratio of Si—OH bonds/Si—O bonds by the method for heat-treating the silicon-compound-coated fine metal particles, a dry-heat treatment can be performed or heat treatment can be performed in a dispersion state, in which the silicon-compound-coated fine metal particles are dispersed in a dispersion medium.

(Method for Controlling the Ratio of Si—OH Bonds or Si—OH Bonds/Si—O Bonds—2)

As the functional group changing treatment of the silicon-compound-coated fine metal particles according to the present invention, other than a reaction, such as dehydration, the ratio of Si—OH bonds or Si—OH bonds/Si—O bonds can be controlled by a reduction reaction or an oxidation reaction by treatment of the silicon-compound-coated fine metal particles in a reducing atmosphere or an oxidizing atmosphere. For example, the ratio of Si—OH bonds or Si—OH bonds/Si—O bonds can be controlled by treating a powder of the silicon-compound-coated fine metal particles with a reducing gas, such as hydrogen, ammonia, hydrogen sulfide, sulfur dioxide, or nitrogen monoxide, an oxidizing gas, such as oxygen, ozone, or nitrogen dioxide, or the like inside a furnace to change an oxidation number of Si or M contained in the silicon-compound-coated fine metal particles, with which the surfaces of the fine metal particles are at least partially coated with the silicon compound. Such functional group changing treatments, including the oxidation treatment or reduction treatment mentioned above, may be performed in combination, for example, in a method for performing a heat treatment and a reduction treatment at the same time or the like.

(Method for Controlling the Ratio of Si—OH Bonds or Si—OH Bonds/Si—O Bonds—3)

Also, as will be described later, the ratio of Si—OH bonds or the ratio of Si—OH bonds/Si—O bonds may be controlled by dispersing the silicon-compound-coated fine metal particles in an intended solvent, adding a substance containing a functional group to the dispersion liquid, and applying a treatment, such as stirring, or the ratio of Si—OH bonds or the ratio of Si—OH bonds/Si—O bonds may be controlled by continuing to apply the treatment, such as stirring, as it is to the dispersion liquid containing the silicon-compound-coated fine metal particles precipitated by mixing the metal raw material liquid, the metal precipitation solvent, and a silicon compound raw material liquid. Furthermore, the control can be performed by constructing an apparatus, in which a dispersing device and a membrane filter are arranged in series, and changing, in performing such a method as applying a dispersion treatment on the particles and performing cross-flow membrane filtration to remove impurities from a slurry containing the silicon-compound-coated fine metal particles, the temperature of the slurry, the temperature of a washing liquid used for cross flow, or the like. In this case, a uniform modifying treatment can be performed on the primary particles and particularly the surfaces of the respective primary particles of the silicon-compound-coated fine metal particles and there is therefore an advantage that the control of the ratio of Si—OH bonds or the ratio of Si—OH bonds/Si—O bonds contained in the silicon-compound-coated fine metal particles and the control of dispersibility and other properties of the present invention can be performed more precisely and homogeneously.

In regard to the pH adjustment for precipitating the silicon-compound-coated fine metal particles, the adjustment may be performed by a pH adjusting agent, such as an acidic or basic substance, being included in at least one of various solutions and solvents in the present invention or adjustment may be performed by changing the flow rate when mixing a fluid containing the metal raw material liquid with a fluid containing the metal precipitation solvent.

The method for changing the functional groups contained in the silicon-compound-coated fine metal particles according to the present invention is not particularly limited. The change may be achieved by dispersing the silicon-compound-coated fine metal particles in an intended solvent, adding a substance containing a functional group to the dispersion liquid, and subjecting the dispersion liquid to a treatment such as stirring or the change may be achieved by mixing a fluid, containing the silicon-compound-coated fine metal particles, with a fluid, containing a substance containing a functional group, using a microreactor described in Patent Literature 5.

The substance containing a functional group is not particularly limited, but is a substance containing a functional group that can be substituted with a hydroxyl group contained in the silicon-compound-coated fine metal particles and examples of such a substance include acylating agents, such as acetic anhydride and propionic anhydride; methylating agents, such as dimethyl sulfate and dimethyl carbonate; silane coupling agents, such as chlorotrimethylsilane and methyltrimethoxysilane; and the like. Other than the above, for example, a fluorine-containing compound, such as trifluoroacetic acid or trifluoromethanesulfonic acid that is a substance containing a CF bond, which is a hydrophobic group, or an anhydride of such substance, or a fluorine-containing silane coupling agent, such as triethoxy-1H,1H, 2H,2H-heptadecafluorodecylsilane or trimethoxy(3,3,3-trifluoropropyl)silane, or a fluorine compound, such as trifluoromethane or trifluoroethane can be cited. Further, it is also possible to control the ratio of Si—OH bonds or the ratio of Si—OH bonds/Si—O bonds contained in silicon-compound-coated oxide particles, for example, by a method for making a gas, such as trifluoromethane or trifluoroethane, act on silicon-compound-coated oxide particles as well. Specifically, when such substances containing a functional group that can be substituted with a hydroxyl group is used, the ratio of Si—OH bonds can be controlled.

As mentioned above, the ratio of Si—OH bonds or the ratio of Si—OH bonds/Si—O bonds can also be controlled by a method for making hydrogen peroxide or ozone act on the oxide particles. The method for making hydrogen peroxide or ozone act on the silicon-compound-coated fine metal particles is not particularly limited. It may be performed by dispersing the silicon-compound-coated fine metal particles in an intended solvent, adding hydrogen peroxide or ozone or an aqueous solution or other solution containing these substances, and performing a treatment, such as stirring, or it may be performed by mixing a fluid, containing the silicon-compound-coated fine metal particles, and a fluid, containing hydrogen peroxide or ozone, using the microreactor described in Patent Literature 5.

The dispersion may be a liquid dispersion, in which the silicon-compound-coated fine metal particles are dispersed in a liquid dispersion medium, such as water, an organic solvent, or resin, or may be a film-like dispersion prepared using a dispersion liquid containing the silicon-compound-coated fine metal particles. Performing heat treatment in a state of a dispersion containing the silicon-compound-coated fine metal particles is suitable for reducing the number of steps and for precise control of properties because aggregation of particles can be suppressed as compared with heat treatment in a dry state and, for example, when the silicon-compound-coated fine metal particles of the present invention are used in a coating film, the properties of the silicon-compound-coated fine metal particles can be controlled by controlling the ratio of Si—OH bonds or the ratio of Si—OH bonds/Si—O bonds contained in the silicon-compound-coated fine metal particles by such a method as heat treatment after the silicon-compound-coated fine metal particles are processed into a coating film.

Also, other than the coating film application mentioned above, the silicon-compound-coated fine metal particles can also be used in a composition for transparent material to be used, for example, in a glass, film, transparent resin, or the like of a building, by dispersing in a glass, a resin, or the like and thereby used suitably to shield against electromagnetic waves, such as ultraviolet rays and near-infrared rays, and can thus be used suitably as a silicon-compound-coated fine metal composition for a purpose of ultraviolet protection or near-infrared protection as well. Also, as with the coating film mentioned above, the particles are suitable for reducing the number of steps and for precise control of properties because, as with the coating film mentioned above, the properties of the silicon-compound-coated fine metal particles can be controlled by controlling the ratio of Si—OH bonds or the ratio of Si—OH bonds/Si—O bonds contained in the silicon-compound-coated fine metal particles by performing functional group changing treatment by heat treatment or the like after the silicon-compound-coated fine metal particles are dispersed in a glass, a transparent resin, or the like and processed into a film.

In the present invention, the primary particle diameter of the metal particles in the silicon-compound-coated fine metal particles is preferably 1 μm or less, and more preferably 1 nm or more and 1 μm or less. Also, the primary particle diameter of the silicon-compound-coated fine metal particles that are coated is preferably 1 μm or less, and more preferably 1 nm or more and 0.5 μm or less. It can be assumed that the control of the properties of the silicon-compound-coated fine metal particles can be performed precisely because the Si—OH bonds or the Si—O bonds contained in the silicon-compound-coated fine metal particles are present mainly on the particle surfaces, and therefore with the silicon-compound-coated fine metal particles that have a primary particle diameter of 1 μm or less are thus have an increased surface area as compared with silicon-compound-coated fine metal particles having a primary particle diameter of more than 1 μm, influences, imparted on such properties as dispersibility of the silicon-compound-coated fine metal particles by the control of the ratio of Si—OH bonds or the ratio of Si—OH bonds/Si—O bonds of the silicon-compound-coated fine metal particles, are considered to be high. Silicon-compound-coated fine metal particles having a primary particle diameter of 1 nm or less thus provide an advantage of enabling predetermined properties (especially properties suitable for use in a coating composition for purpose of use in a coating film, a coated body, or the like, a composition for transparent material for purpose of use in a coated body, glass, transparent resin, or film, with which transparency is required, a magnetic composition for purpose of use in a magnetic body, such as a magnetic fluid, a semiconductor composition for purpose of use in a semiconductor or the like, a conductive composition for purpose of use as a conductive material, or a reaction composition for purpose of use in reaction material or the like or a catalyst composition for purpose of use in catalyst material or the like) to be exhibited suitably by control of the ratio of Si—OH bonds or the ratio of Si—OH bonds/Si—O bonds contained in the silicon-compound-coated fine metal particles.

With the silicon-compound-coated fine metal particles according to the present invention, a ratio of the average primary particle diameter of the silicon-compound-coated fine metal particles with respect to the average primary particle diameter of the fine metal particles before coating with the silicon compound is preferably 100.5% or more and 190% or less. If the coating of the silicon compound on the fine metal particles is too thin, there is a possibility that an effect related to the properties that the silicon-compound-coated fine metal particles have and so forth cannot be exhibited, and therefore, the average primary particle diameter of the silicon-compound-coated fine metal particles is preferably 100.5% or more of the average primary particle diameter of the metal particles, and because when the coating is too thick or when coarse aggregates are coated, it is difficult to control the properties, and when the thickness of the coating exceeds 1 μm, a possibility of mutual overlapping of the Si—OH-bond-derived peaks and the Si—O-bond-derived peaks in the IR measurement result arises, the average primary particle diameter of the silicon-compound-coated fine metal particles is preferably 190% or less of the average primary particle diameter of the fine metal particles. The various compositions according to the present invention include fine metal particles with surfaces at least partially covered with a silicon compound, that is, the silicon-compound-coated fine metal particles per se. The silicon-compound-coated fine metal particles according to the present invention may be silicon-compound-coated fine metal particles of core-shell type, with which entire surfaces of the fine metal particles serving as cores are uniformly coated with the silicon compound. Also, although the silicon-compound-coated fine metal particles are preferably silicon-compound-coated fine metal particles, with which a plurality of fine metal particles are not aggregated and with which surfaces of single metal particles are at least partially coated with the silicon compound, the particles may also be silicon-compound-coated fine metal particles, with which surfaces of aggregates, each formed by aggregation of a plurality of fine metal particles, are at least partially coated with the silicon compound. However in this case, the silicon-compound-coated fine metal particles, with which the above-mentioned aggregates that exceed a certain size are coated with the silicon compound, are not preferable in that dispersibility and other properties mentioned above cannot be obtained readily in comparison to the silicon-compound-coated fine metal particles, with which the surface of single fine metal particles are at least partially covered with the silicon compound. Here, the aggregates exceeding a certain size refer, for example, to aggregates that exceed 1 μm in size. Also, the particle diameter of the silicon-compound-coated fine metal particles, with which surfaces of aggregates, each formed by aggregation of a plurality of fine metal particles, are at least partially coated with the silicon compound, is preferably 100.5% or more and 190% or less of the diameter of the aggregates. Here, the diameter of the aggregates is deemed to be the distance between the maximum outer circumferences of the aggregates.

(Method for Producing Silicon-Compound-Coated Fine Metal Particles: Preferable Method)

As an example of a method for producing the silicon-compound-coated fine metal particles according to the present invention, it is preferred to use a method for producing the silicon-compound-coated fine metal particles by preparing a metal raw material liquid, containing at least a raw material of the metal particles that are to be coated with the silicon compound, and a metal precipitation solvent, containing at least a metal precipitation substance for precipitating the metal particles, precipitating the fine metal particles by a method of reaction, crystallization, separation, co-precipitation, or the like in a mixture fluid, in which the metal raw material liquid and the metal precipitation solvent are mixed, and mixing the mixture fluid, containing the precipitated fine metal particles, with a silicon compound raw material liquid, containing at least a raw material of the silicon compound, to coat the surfaces of the fine metal particles at least partially with the silicon compound. Also, in a case where the fine metal particles are fine alloy particles and the purpose is to prepare silicon-compound-coated fine alloy particles, the plurality of different metal elements or metalloid elements contained in the fine metal particles may be contained together in the metal raw material liquid or may be contained respectively in the metal raw material liquid and the metal precipitation solvent, or may be contained in both the metal raw material liquid and the metal precipitation solvent or the silicon compound raw material liquid.

The raw material of the silicon-compound-coated fine metal particles in the present invention are not limited in particular. Any raw material that can be formed into the silicon-compound-coated fine metal particles by a method of reaction, crystallization, separation, co-precipitation, or the like may be applicable. Also, with the present invention, a compound of a metal or a metalloid is referred to generally as a compound. The compound is not limited in particular and to give an example, a salt, oxide, hydroxide, hydroxide oxide, nitride, carbide, complex, organic salt, organic complex, or organic compound of a metal or a metalloid that contains a metal element or a metalloid element, or a hydrate, organic solvate, or the like of such a compound can be cited. An elementary metal or metalloid may also be used. The salt of a metal or metalloid is not limited in particular and a nitrate, nitrite, sulfate, sulfite, carbonate, formate, acetate, phosphate, phosphite, hypophosphite, chloride, oxy salt, or acetylacetonate salt of a metal or a metalloid, or a hydrate, organic solvate, or the like of such a salt can be cited, and as the organic compound, an alkoxide or the like of a metal or a metalloid can be cited. These metal or metalloid compounds may be used alone or may be used as a mixture of a plurality or more of the compounds. In the present invention, if the metal constituting the silicon-compound-coated fine metal particles is a plurality of different metal elements or metalloid elements and if the main metal element is M1 and a subsidiary metal element is M2, a molar ratio (M2/M1) of M2 with respect to M1 is preferably 0.01 or more and 1.00 or less.

Also, as the raw material of the silicon compound according to the present invention, an oxide or hydroxide of silicon as well as a compound, such as a salt or alkoxide of silicon, or a hydrate of such a compound can be cited. Although not limited in particular, sodium silicate or other silicate, phenyltrimethoxysilane, methyltrimethoxysilane, methyltriethoxysilane, 3-glycidoxypropyltrimethoxysilane, 3-trifluoropropyltrimethoxysilane, methacryloxypropyltriethoxysilane, tetramethoxysilane (TMOS), tetraethoxysilane (TEOS), ethyl silicate 40 or other oligomer condensate of TEOS, tetraisopropylsilane, tetrapropoxysilane, tetraisobutoxysilane, tetrabutoxysilane, or other similar substance can be cited. Further as the raw material of the silicon compound, any of other siloxane compounds, bis(triethoxysilyl)methane, 1,9-bis(triethoxysilyl)nonane, diethoxydichlorosilane, triethoxychlorosilane, or the like may be used.

Also, when the raw material of the fine metal particles or the silicon compound for coating is a solid, each raw material is preferably used in a molten state or state of being dissolved or mixed (including a state of being molecularly dispersed) in a solvent described later. Even when each raw material is a liquid or a gas, it is preferably used in a state of being dissolved or mixed (including a state of being molecularly dispersed) in a solvent described below.

The metal precipitation substance is not particularly limited as long as it is a substance capable of making the raw material of the silicon-compound-coated fine metal particles, contained in the metal raw material liquid, precipitate as the silicon-compound-coated fine metal particles, and, for example, a reducing agent, capable of reducing ions of the metal or metalloid contained in the metal raw material liquid, is preferably used. The reducing agent is not limited in particular, and all reducing agents capable of reducing the metal element or metalloid element constituting the silicon-compound-coated fine metal particles can be used. As an example, a hydride-based reducing agent, such as sodium borohydride or lithium borohydride, an aldehyde, such as formalin or an aldehyde, a sulfite, a carboxylic acid, such as formic acid, oxalic acid, succinic acid, ascorbic acid, or citric acid, a lactone, a monoalcohol, such as an aliphatic monoalcohol, such as methanol, ethanol butanol, isopropyl alcohol, or octanol, or an alicyclic monoalcohol, such as turpineol, an aliphatic diol, such as ethylene glycol, propylene glycol, diethylene glycol, dipropylene glycol, triethylene glycol, or tetraethylene glycol, a polyol, such as glycerin or trimethylolpropane, a polyether, such as polyethylene glycol or polypropylene glycol, an alkanolamine, such as diethanolamine or monoethanolamine, a phenol, such as hydroquinone, resorcinol, or aminophenol, a saccharide, such as glucose or fructose, sodium citrate, hypochlorous acid or a salt thereof, ions of a transition metal (ions of titanium, iron, or the like), a hydrazine, an amine, such as triethylamine, triethanolamine, dimethylaminoethanol, octylamine, or dimethylaminoborane, a pyrrolidone (polyvinylpyrrolidone, 1-vinyl-2-pyrrolidone, methylpyrrolidone), or the like can be cited, and a reducing gas, such as hydrogen gas or ammonia gas, may also be used.

Also, the metal raw material liquid and the metal precipitation solvent may contain an acidic substance or a basic substance. Examples of the basic substance include metal hydroxides, such as sodium hydroxide and potassium hydroxide, metal alkoxides, such as sodium methoxide and sodium isopropoxide, amine compounds, such as triethylamine, diethylaminoethanol, and diethylamine, ammonia, and the like.

Examples of the acidic substance include inorganic acids, such as aqua regia, hydrochloric acid, nitric acid, fuming nitric acid, sulfuric acid, and fuming sulfuric acid, and organic acids, such as formic acid, acetic acid, chloroacetic acid, dichloroacetic acid, oxalic acid, trifluoroacetic acid, trichioroacetic acid, and citric acid. The basic substance and the acidic substance can also be used for precipitating the silicon-compound-coated metal particles or the compound for coating.

(Solvent)

Examples of the solvent used as the solvent for the metal raw material liquid, the metal precipitation solvent, or the silicon raw material liquid include water, an organic solvent, and a mixed solvent composed of a plurality of the same. Examples of the water include tap water, ion-exchanged water, pure water, ultrapure water, RO water (reverse osmosis water), and the like and examples of the organic solvent include alcohol compound solvents, amide compound solvents, ketone compound solvents, ether compound solvents, aromatic compound solvents, carbon disulfide, aliphatic compound solvents, nitrile compound solvents, sulfoxide compound solvents, halogen compound solvents, ester compound solvents, ionic liquids, carboxylic acid compounds, sulfonic acid compounds, and the like. The above solvents may be used alone or may be used as a mixture of a plurality of the solvents. Examples of the alcohol compound solvents include monohydric alcohols, such as methanol and ethanol, polyols, such as ethylene glycol and propylene glycol, and the like.

(Dispersants, etc.)

Various dispersants and surfactants may be used according to purpose and necessity in a range of not adversely affecting the preparation of the silicon-compound-coated fine metal particles according to the present invention. The dispersant or surfactant is not limited in particular and any of various generally used, commercially available products, manufactured goods, newly synthesized products, or the like can be used. For example, anionic surfactants, cationic surfactants, nonionic surfactants, and various polymers and other dispersants, and the like can be cited. These may be used alone or in combination of two or more thereof. The surfactant and dispersant may be contained in at least one of either of the metal raw material liquid and the metal precipitation solvent. Also, the surfactant and the dispersant may be contained in another fluid different from the metal raw material liquid and the metal precipitation solvent.

(Method for Producing Silicon-Compound-Coated Fine Metal Particles: Outline of Method)

In the step of coating the surfaces of the fine metal particles at least partially with the silicon compound, it is preferable for the fine metal particles to be coated with the silicon compound before the metal particles aggregate. In mixing the silicon compound raw material liquid into the fluid containing the fine metal particles, it is important as to how the silicon compound raw material liquid can be charged and the silicon compound be precipitated on the surfaces of the fine metal particles at a rate faster than that at which aggregation occurs after the fine metal particles precipitate. Further, by charging the silicon compound raw material liquid into the fluid containing the fine metal particles, the pH of the fluid containing the fine metal particles and the concentration of the silicon compound raw material change gradually, and if the silicon compound for coating the surfaces of the particles precipitates after circumstances where the particles are readily dispersed change to circumstances where aggregation occurs readily, there is a possibility that it becomes difficult to achieve coating before aggregation occurs to a degree such that the properties of the present invention cannot be exhibited. It is preferable to make the silicon compound raw material contained in the silicon compound raw material liquid act immediately after the fine metal particles precipitate. It is preferable to obtain the silicon-compound-coated fine metal particles by a method for making the fine metal particles precipitate and coating the silicon compound on the surfaces of the fine metal particles continuously subsequent to the precipitation of the fine metal particles between processing surfaces that are capable of approaching and separating from each other and rotate relative to each other as described in Patent Literature 5. An advantage of enabling the silicon-compound-coated fine metal particles of the present invention to be prepared and the control of the ratio of Si—OH bonds or the ratio of Si—OH bonds/Si—O bonds and the control of the properties of the silicon-compound-coated metal particles thereby to be performed with precision by changing the temperature, the pH, and the formulation conditions in the process of obtaining the silicon-compound-coated fine metal particles is provided. By setting the temperature in the process of obtaining the silicon-compound-coated fine metal particles to a certain temperature or higher, it is possible to prepare silicon-compound-coated fine metal particles, each having a hollow layer between the fine metal particle and the coating layer of the silicon compound in the silicon-compound-coated fine metal particle. Use is made of a shrinkage rate of the silicon compound being lower than a shrinkage rate of the fine metal particles in the silicon-compound-coated fine metal particles by precipitating the fine metal particles under an environment of the certain temperature or higher, then coating the particle surfaces with the silicon compound at approximately the same temperature, and thereafter cooling to a low temperature, such as room temperature. In the present invention, the temperature for obtaining the silicon-compound-coated metal particles having a hollow layer is preferably 150° C. or more and more preferably 200° C. or more.

(Method for Producing Silicon-Compound-Coated Fine Metal Particles: Apparatus)

Figure 4:
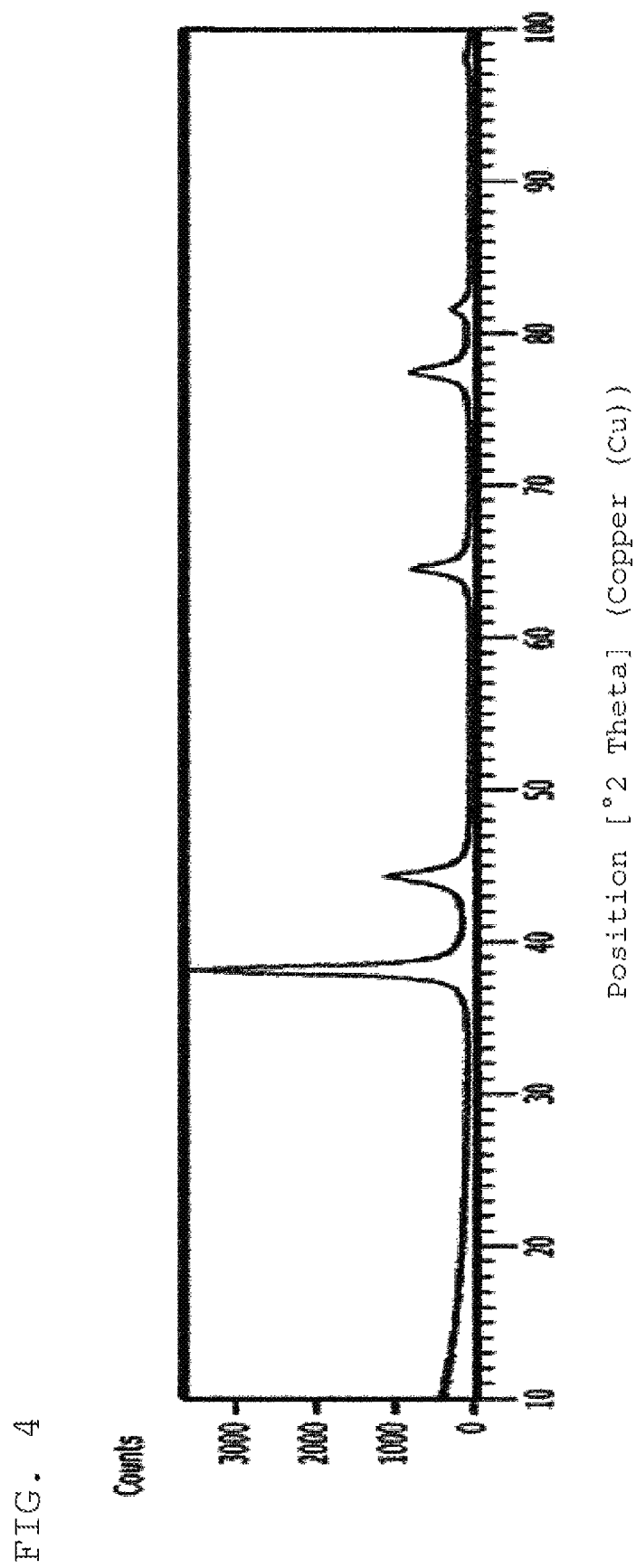
FIG. 4 is a diagram illustrating results of XRD measurements of the silicon-compound-coated fine silver particles obtained in Example 1-1.
Figure 5:
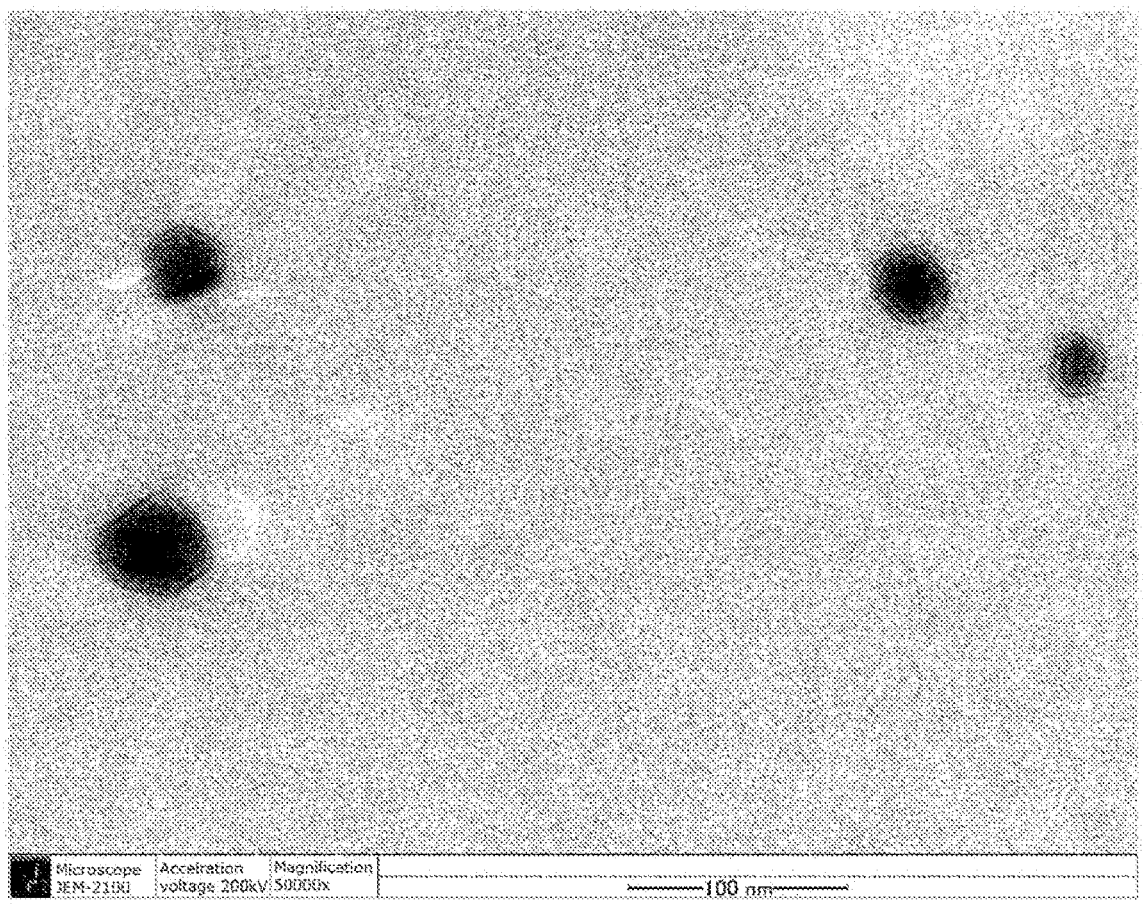
FIG. 5 is a TEM photograph observed using a collodion membrane prepared from an aqueous dispersion liquid of the silicon-compound-coated fine silver particles obtained in Example 1-1.

Examples of the method for producing the silicon-compound-coated fine metal particles according to the present invention include methods of preparing the silicon-compound-coated fine metal particles and so forth by using a microreactor, performing a reaction in a dilute system inside a batch vessel, or the like. Also, the apparatus and the method as described in Publication of JP 2009-112892, which are proposed by the applicant of the present application, may be used to prepare the silicon-compound-coated fine metal particles. The apparatus described in Publication of JP 2009-112892 has a stirring tank, having an inner circumferential surface with a circular cross section, and an stirring tool, installed with there being a slight gap from the inner circumferential surface of the stirring tank, the stirring tank includes at least two fluid inlets and at least one fluid outlet, a first fluid to be processed, which, among fluids to be processed, contains one reactant, is introduced into the stirring tank from one of the fluid inlets, a second fluid to be processed, containing one reactant different from the above reactant, is introduced into the stirring tank from the other one of the fluid inlets by a flow path different from that of the first fluid to be processed, at least one of either of the stirring tank and the stirring tool rotates at a high speed with respect to the other, thereby bringing the fluids to be processed into a thin film state, and in this thin film, at least the reactants contained in the first fluid to be processed and the second fluid to be processed are made to react with each other, and it is stated that, in order to introduce three or more fluids to be processed into the stirring tank, three or more introduction pipes may be provided as illustrated in FIG. 4 and FIG. 5 of the publication. Also, examples of the microreactor described above include apparatuses of the same principle as fluid treatment apparatuses described in Patent Literature 5.

As a method for producing the silicon-compound-coated fine metal particles of the present invention that differs from the above method, a method for treating fine particles of a substance, capable of being a precursor of the metal contained in the fine metal particles, in a reducing atmosphere can be cited. Specifically, the method is one where silicon-compound-coated fine precursor particles, with which surfaces of fine particles containing the precursor are at least partially coated with the silicon compound, or silicon-doped fine precursor particles, with which fine particles containing the precursor are doped with silicon, are prepared and the silicon-compound-coated fine precursor particles or the silicon-doped fine precursor particles are treated in the reducing atmosphere. As the precursor, an oxide, a hydroxide, a nitride, a carbide, any of various salts, such as a nitrate, sulfate, or carbonate, a hydrate, or an organic solvate containing a metal element or a metalloid element that constitutes the fine metal particles can be cited. For example, by heat treating the silicon-compound-coated fine precursor particles, such as silicon-compound-coated iron oxide particles, in a hydrogen atmosphere, which is a reducing atmosphere, reduction to silicon-compound-coated iron particles can be performed. Also, even in a case where, by treating the silicon-compound-coated fine precursor particles in the reducing atmosphere, the silicon compound is also reduced all the way to silicon, conversion to a silicon oxide or other silicon compound is possible by treating in air or other air atmosphere and therefore the silicon-compound-coated fine metal particles can be obtained in the same manner as the above. By thus treating the silicon-compound-coated fine precursor particles, containing the precursor to the fine metal particles, in the reducing atmosphere, an advantage is provided in that not only is it possible to perform the production of the silicon-compound-coated fine metal particles and the ratio of Si—OH bonds or the ratio of Si—OH bonds/Si—O bonds at practically the same time but it is also possible to perform the ratio of Si—OH bonds or the ratio of Si—OH bonds/Si—O bonds more precisely.

Also, the silicon-compound-coated fine metal particles according to the present invention can also be obtained by treating the silicon-doped fine precursor particles, with which silicon is contained in the precursor, in the reducing atmosphere. For example, first, by heat treating silicon-doped iron oxide particles, which are silicon-doped precursor particles, under the reducing atmosphere, both silicon and iron are reduced and silicon-iron alloy particles can be obtained. Next, by treating the obtained silicon-iron alloy particles in an oxidizing atmosphere, such as air, and oxidizing the silicon, contained in surfaces of the silicon-iron alloy particles, to a silicon oxide or other silicon compound, the silicon-compound-coated fine metal particles, such as silicon-compound-coated iron particles or silicon-compound-coated silicon-iron alloy particles, can be prepared.

Also, the present inventors have found that, by the heat treatment, a change occurs where the silicon contained in the metal particles or the oxide or other precursor particles migrates from inner sides to exteriors of the particles. It has been found that even in a case where particles are fused to each other, a state can be realized where silicon or a silicon compound is decreased to a state of not being contained at fused portions between particles, and surfaces of the particles, which, due to fusion, have increased in particle diameter in comparison to before treatment, can be put in a state of being coated with the silicon compound. With the silicon-compound-coated fine metal particles, which are prepared using these methods and with which silicon is contained in interiors of the fine metal particles at least before the application of heat treatment and with which, by the application of heat treatment, the silicon have been made to migrate from the interiors toward outer circumferences of the fine metal particles in comparison to before the application of heat treatment, an advantage is provided in that the reduction or control of particle diameter of the precursor particles and the control of the ratio of Si—OH bonds or the ratio of Si—OH bonds/Si—O bonds can respectively be performed at the same time. However, the present invention is not limited to performing the reduction and the control of the ratio of Si—OH bonds or the ratio of Si—OH bonds/Si—O bonds at the same time. Also, for example, in a case of using the silicon-compound-coated fine metal particles according to the present invention in a wiring material or the like that is a conductive material, a conductive wiring can be formed of the metal element contained in the silicon-compound-coated fine metal particles and, at the same time, an outer circumferential part of the wiring can be put in a state of being coated by the silicon compound, thus providing an advantage of enabling the metal, forming the wiring, to be protected from moisture and protected from oxidation by the silicon compound at the outer circumferential part of the wiring. With the present invention, the reduction treatment of the silicon-compound-coated fine precursor particles or the silicon-doped fine precursor particles may be performed by a dry method or may be performed by a wet method.

In the case of obtaining the silicon-compound-coated fine metal particles by reduction of the silicon-compound-coated fine precursor particles or the silicon-doped precursor particles, it is preferable for a particle diameter of the silicon-compound-coated fine precursor particles to be 100 nm or less. By the particle diameter being 100 nm or less, uniform reduction treatment to the silicon-compound-coated fine metal particles is made possible, providing not only the advantage of enabling the control of the ratio of Si—OH bonds or the ratio of Si—OH bonds/Si—O bonds to be performed at the same time but also providing an advantage of enabling fine metal particles to be produced by reduction even with a base metal, which conventionally could not be reduced readily except by a method, such as electroreduction using a large amount of electricity or other energy. A method for producing the silicon-compound-coated precursor particles is not limited in particular, and, as with the silicon-compound-coated fine metal particles, a preparation method using the apparatus described in Patent Literature 5 may be performed or fine precursor particles may be prepared using a bead mill or other pulverization method or the like and, after the preparation, a treatment of coating the silicon compound on the precursor particles inside a reaction vessel or using above-described the microreactor or the like may be performed.

(Correspondence Relationship to Priority Claim Applications)

The present inventors found that dispersibility and other properties of silicon-compound-coated fine metal particles can be controlled by controlling the ratio of Si—OH bonds or the ratio of Si—OH bonds/Si—O bonds contained in the silicon-compound-coated fine metal particles and have thereby completed the present invention. Coating of a silicon compound on surfaces of various fine particles and obtaining of silicon-compound-coated fine metal oxide particles, which can be a precursor to silicon-compound-coated fine metal particles and with which the silicon compound is a silicon oxide, are also disclosed in Japanese Patent Application No. 2016-111346, which is a basic application of the present application, and the inventors found that, with these particles, reduction all the way to a metal can be performed in a reducing atmosphere. The present inventors further found that by controlling the Si—OH bonds contained in the silicon-compound-coated fine metal particles in a specific atmosphere as disclosed in PCT/JP2016/83001, which is another basic application of the present application, dispersibility and other properties of the silicon-compound-coated fine metal particles can be controlled.

EXAMPLES

Hereinafter, the present invention will be described in more detail with reference to Examples, but the present invention is not limited to only these Examples. Pure water used in the Examples below was of a conductivity of 0.84 μS/cm (measurement temperature: 25° C.), unless otherwise noted.

(Preparation of Samples for TEM Observation and Preparation of Samples for STEM Observation)

Silicon-compound-coated fine metal particles obtained in the Examples were dispersed in a dispersion medium, the obtained dispersion liquid was dropped on a collodion membrane and dried to prepare a sample for TEM observation or a sample for STEM observation.

(Transmission Electron Microscope and Energy Dispersive X-Ray Analysis Apparatus: TEM-EDS Analysis)

For observation and quantitative analysis of the silicon-compound-coated fine metal particles by TEM-EDS analysis, a transmission electron microscope JEM-2100 (manufactured by JEOL Ltd.) equipped with an energy dispersive X-ray analyzer JED-2300 (manufactured by JEOL Ltd.) was used. For observation, conditions were an acceleration voltage of 80 kV and a magnification of ×25,000 or more. The particle diameter was calculated from the distance between the maximum outer circumferences of silicon-compound-coated fine metal particles observed by TEM, and then the average value (average primary particle diameter) of the results of measuring the particle diameters of 100 particles was calculated. The molar ratio of the elemental components that constitute the silicon-compound-coated fine metal particles was calculated by TEM-EDS, and then the average value of the results of calculating the molar ratio for 10 or more particles was calculated.

(Scanning Transmission Electron Microscope and Energy Dispersive X-Ray Analysis Apparatus: STEM-EDS Analysis)

For the mapping and quantification of elements contained in the silicon-compound-coated fine metal particles by STEM-EDS analysis, an atomic resolution analytical electron microscope JEM-ARM 200F (manufactured by JEOL Ltd.) equipped with an energy dispersive X-ray analyzer Centurio (manufactured by JEOL Ltd.) was used. Analysis was performed upon setting the observation conditions to an acceleration voltage of 80 kV, a magnification of ×50,000 or more, and a beam size of 0.2 nm in diameter.

(X-Ray Diffraction Measurement)

For X-ray diffraction (XRD) measurement, a powder X-ray diffractometer EMPYREAN (manufactured by PANalytical Division, Spectris Co., Ltd.) was used. Measurement conditions were as follows: a measurement range of 10 to 100 [° 2θ], a Cu anticathode, a tube voltage of 45 kV, a tube current of 40 mA, and a scan rate of 0.3 degrees per minute. XRD measurement was carried out on a dried powder of the silicon-compound-coated fine metal particles obtained in each Example.

(FT-IR Measurement)

FT-IR measurement was carried out using a Fourier transform infrared spectrophotometer FT/IR-6600 (manufactured by JASCO Corporation). The measurement conditions were a resolution of 4.0 cm$^{-1}$ and a number of times of accumulation of 1024 using an ATR method under a nitrogen atmosphere. Waveform separation of peaks at wavenumbers of 750 cm$^{-1}$ to 1350 cm$^{-1}$ in the IR spectrum was performed using the spectral analysis program attached to the control software of FT/IR-6600 mentioned above to give a residual square sum of 0.01 or less. Measurement was carried out using the dried powder of silicon-compound-coated fine metal particles obtained in the Examples.

(Particle Size Distribution Measurement)

For particle size distribution measurement, a particle size analyzer, UPA-UT151 (made by NIKKISO), was used. As measurement conditions, the dispersion medium, in which the silicon-compound-coated fine metal obtained in each Example was dispersed, was used as a measurement solvent, and as a particle refractive index and density, numerical values of the main metal element or metalloid element constituting the metal fine particles in the silicon-compound-coated fine metal particles obtained in each Example were used.

Example 1

With Example 1, silicon-compound-coated fine metal particles were prepared using an apparatus of the principles described in Patent Literature 5 and examples of controlling dispersibility in various dispersion media by controlling the ratio of Si—OH bonds or the ratio of Si—OH bonds/Si—O bonds contained in the silicon-compound-coated fine metal particles are illustrated. Using a high-speed rotation-type dispersion emulsifier CLEARMIX (product name: CLM-2.2S, manufactured by M Technique Co., Ltd.), a metal raw material liquid (liquid A), a metal precipitation solvent (liquid B), and a silicon compound raw material liquid (liquid C) were prepared. Specifically, based on the formulation of the metal raw material liquid indicated for Example 1 in Table 1, the respective ingredients of the metal raw material liquid were stirred and homogeneously mixed together at a preparation temperature of 50° C. for 30 minutes using CLEARMIX at a rotor rotational speed of 20,000 rpm to prepare the metal raw material liquid. Also, based on the formulation of the metal precipitation solvent indicated for Example 1 in Table 2, the respective ingredients of the metal precipitation solvent were stirred and homogeneously mixed together at a preparation temperature of 25° C. for 30 minutes, using CLEARMIX at a rotor rotational speed of 8,000 rpm to prepare the metal precipitation solvent. Furthermore, based on the formulation of the silicon compound raw material liquid indicated for Example 1 in Table 3, the respective ingredients of the silicon compound raw material liquid were stirred and homogeneously mixed together at a preparation temperature of 20° C. for 10 minutes using CLEARMIX at a rotor rotational speed of 6,000 rpm to prepare the silicon compound raw material liquid. Regarding the substances indicated by chemical formulas and abbreviations indicated in Table 1 to Table 3, as MeOH, methanol (manufactured by Mitsubishi Chemical Corporation) was used, as EG, ethylene glycol (manufactured by Kishida Chemical Co., Ltd.) was used, as KOH, potassium hydroxide (manufactured by Nippon Soda Co., Ltd.) was used, as NaOH, sodium hydroxide (manufactured by KANTO CHEMICAL CO., INC.) was used, as TEOS, tetraethyl orthosilicate (manufactured by Wako Pure Chemical Industries, Ltd.) was used, as $AgNO_3$, silver nitrate (manufactured by KANTO CHEMICAL CO., INC.) was used, as $NaBH_4$, sodium tetrahydroborate (manufactured by Wako Pure Chemical Industries, Ltd.) was used, as HMH, hydrazine monohydrate (manufactured by KANTO CHEMICAL CO., INC.) was used, as PVP, polyvinylpyrrolidone K=30 (manufactured by KANTO CHEMICAL CO., INC.) was used, as DMAE, 2-dimethylaminoethanol (manufactured by KANTO CHEMICAL CO., INC.) was used, and as $H_2SO_4$, concentrated sulfuric acid (manufactured by Kishida Chemical Co., Ltd.) was used.

Subsequently, the prepared metal raw material liquid, metal precipitation solvent, and silicon compound raw material liquid were mixed together using a fluid treatment apparatus described in Patent Literature 5 of the present applicant. Here, the fluid treatment apparatus described in Patent Literature 5 is one described in FIG. 1(B) of the literature and that having a concentric circular annular shape, with which openings d20 and d30 of second and third introduction portions surround an opening at the center of a processing surface 2 that is a disk formed in a ring shape, was used. In particular, as a liquid A, the metal raw material liquid or the metal precipitation solvent was introduced from the first introduction portion d1 into between the processing surfaces 1 and 2, and while driving a processing portion 10 at a rotational speed of 1,130 rpm, the other of the metal raw material liquid or the metal precipitation solvent, differing from the liquid fed as the liquid A, was introduced as a liquid B from the second introduction portion d2 into between the processing surfaces 1 and 2, and the metal raw material liquid and the metal precipitation solvent were mixed in a thin film fluid to precipitate fine silver particles, which are to be cores, between the processing surfaces 1 and 2. Then, as a liquid C, the silicon compound raw material liquid was introduced from a third introduction portion d3 into between the processing surfaces 1 and 2 and mixed with the mixture fluid, containing the fine silver particles, which are to be the cores, in the thin film fluid. A silicon compound was precipitated on the surfaces of the fine silver particles, which are to be the cores, and then a discharged liquid, containing the silicon-compound-coated fine silver particles (hereinafter referred to as a silicon-compound-coated fine silver particle dispersion liquid), was discharged from between the processing surfaces 1 and 2 of the fluid treatment apparatus. The discharged silicon-compound-coated fine silver particle dispersion liquid was collected in a beaker b through a vessel v.

Table 4 shows operating conditions of the fluid treatment apparatus, the Si/M molar ratios (Si/Ag in the case of Example 1) calculated from the TEM-EDS analysis calculated from the TEM observation results of the obtained silicon-compound-coated fine silver particles, and calculated values calculated from the formulations and introduction flow rates of the liquids A, liquids B, and liquids C. Introduction temperatures (liquid feed temperatures) and introduction pressures (liquid feed pressures) of the liquids A, liquids B, and liquids C shown in Table 4 were measured using thermometers and pressure gauges installed inside sealed introduction passages (first introduction portion d1, second introduction portion d2, and third introduction port d3) in communication with an interval between processing surfaces 1 and 2, and the introduction temperature of each liquid A shown in Table 2 is the actual temperature of the liquid A under the introduction pressure in the first introduction portion d1, the introduction temperature of each liquid B is likewise the actual temperature of the liquid B under the introduction pressure in the second introduction portion d2, and the introduction temperature of each liquid C is likewise the actual temperature of the liquid C under the introduction pressure in the third introduction portion d3.

The measurement of pH was performed using a pH meter of type D-51 made by HORIBA, Ltd. Before the introduction of a liquid A, a liquid B, and a liquid C into the fluid treatment apparatus, the pH vales of these liquids were measured at room temperature. Also, it is difficult to measure the pH of the mixed fluid immediately after mixing the metal raw material liquid and the metal precipitation solvent and the pH immediately after mixing the fluid containing the fine silver particles, which are to be the cores, and the silicon compound raw material liquid, and thus the pH of the silicon-compound-coated fine silver particle dispersion liquid that was discharged from the apparatus and then collected into the beaker b was measured at room temperature.

From the silicon-compound-coated fine silver particle dispersion liquid discharged from the fluid treatment apparatus and then collected into the beaker b, a dried powder and a wet cake sample were prepared. The preparation method was carried out according to a conventional method of this type of treatment, and the discharged silicon-compound-coated fine silver particle dispersion liquid was collected, the silicon-compound-coated fine silver particles were made to settle, a resulting supernatant was removed, the settled particles were subsequently subjected repeatedly to washing with 100 parts by weight of pure water and settling and repeatedly washed until a conductivity of a wash liquid containing the silicon-compound-coated fine silver particles became 10 µS/cm or less, and a part of a wet cake of the finally obtained silicon-compound-coated fine silver particles was dried at 25° C. under –0.10 MPaG for 20 hours to give a dried powder. The remainder was taken as a wet cake sample.

TABLE 1

Formulation of the 1st fluid
(Liquid A: metal raw material liquid)

| | | Formulation | | | | pH | |
|---|---|---|---|---|---|---|---|
| | Raw material | [wt %] | Raw material | [wt %] | pH | [° C.] | |
| Example | 1-1 | $AgNO_3$ | 0.150 | Pure water | 99.850 | 4.92 | 14.4 |
| | 1-2 | $AgNO_3$ | 0.150 | Pure water | 99.850 | 4.92 | 14.4 |
| | 1-3 | $AgNO_3$ | 0.150 | Pure water | 99.850 | 4.92 | 14.4 |
| | 1-4 | $AgNO_3$ | 0.150 | Pure water | 99.850 | 4.92 | 14.4 |
| | 1-5 | $AgNO_3$ | 0.150 | Pure water | 99.850 | 4.92 | 14.4 |
| | 1-6 | $AgNO_3$ | 0.150 | Pure water | 99.850 | 4.92 | 14.4 |
| | 1-7 | $AgNO_3$ | 0.038 | EG | 99.962 | 3.28 | 21.1 |
| | 1-8 | $AgNO_3$ | 0.038 | EG | 99.962 | 3.28 | 21.1 |
| | 1-9 | $AgNO_3$ | 0.038 | EG | 99.962 | 3.28 | 21.1 |

TABLE 2

Formulation of the 2nd fluid
(Liquid B: metal precipitation solvent)

| | | Formulation | | | | | | | | | | | pH | |
|---|---|---|---|---|---|---|---|---|---|---|---|---|---|---|
| | | Raw material | [wt %] | Raw material | [wt %] | Raw material | [wt %] | Raw material | [wt %] | Raw material | [wt %] | Raw material | [wt %] | pH | [° C.] |
| Example | 1-1 | $NaBH_4$ | 0.650 | NaOH | 1.000 | Pure water | 98.350 | — | 0.000 | — | 0.000 | — | 0.000 | >14 | — |
| | 1-2 | $NaBH_4$ | 0.650 | NaOH | 1.000 | Pure water | 98.350 | — | 0.000 | — | 0.000 | — | 0.000 | >14 | — |
| | 1-3 | $NaBH_4$ | 0.650 | NaOH | 1.000 | Pure water | 98.350 | — | 0.000 | — | 0.000 | — | 0.000 | >14 | — |
| | 1-4 | $NaBH_4$ | 0.650 | NaOH | 1.000 | Pure water | 98.350 | — | 0.000 | — | 0.000 | — | 0.000 | >14 | — |
| | 1-5 | $NaBH_4$ | 0.650 | NaOH | 1.000 | Pure water | 98.350 | — | 0.000 | — | 0.000 | — | 0.000 | >14 | — |
| | 1-6 | $NaBH_4$ | 0.650 | NaOH | 1.000 | Pure water | 98.350 | — | 0.000 | — | 0.000 | — | 0.000 | >14 | — |
| | 1-7 | HMH | 20.00 | PVP | 9.75 | DMAE | 5.00 | KOH | 2.55 | Pure water | 7.45 | EG | 55.25 | >14 | — |
| | 1-8 | HMH | 20.00 | PVP | 9.75 | DMAE | 5.00 | KOH | 2.55 | Pure water | 7.45 | EG | 55.25 | >14 | — |
| | 1-9 | HMH | 20.00 | PVP | 9.75 | DMAE | 5.00 | KOH | 2.55 | Pure water | 7.45 | EG | 55.25 | >14 | — |

TABLE 3

Formulation of the 3rd fluid
(Liquid C: silicon compound raw material liquid)

| | | Formulation | | | | | | pH | |
|---|---|---|---|---|---|---|---|---|---|
| | | Raw material | [wt %] | Raw material | [wt %] | Raw material | [wt %] | pH | [° C.] |
| Example | 1-1 | $H_2SO_4$ | 0.3100 | TEOS | 0.1300 | MeOH | 99.5600 | 1.75 | 14.4 |
| | 1-2 | $H_2SO_4$ | 0.3100 | TEOS | 0.1300 | MeOH | 99.5600 | 1.75 | 14.4 |
| | 1-3 | $H_2SO_4$ | 0.3100 | TEOS | 0.1300 | MeOH | 99.5600 | 1.75 | 14.4 |
| | 1-4 | $H_2SO_4$ | 0.4320 | TEOS | 0.1300 | MeOH | 99.4380 | 1.26 | 13.6 |
| | 1-5 | $H_2SO_4$ | 0.2340 | TEOS | 0.1300 | MeOH | 99.6360 | 1.89 | 14.3 |
| | 1-6 | $H_2SO_4$ | 0.0560 | TEOS | 0.1300 | MeOH | 99.8140 | 2.84 | 15.1 |
| | 1-7 | MeOH | 1.2300 | TEOS | 0.0279 | EG | 98.7421 | 3.46 | 23.3 |
| | 1-8 | MeOH | 1.2300 | TEOS | 0.0279 | EG | 98.7421 | 3.46 | 23.3 |
| | 1-9 | MeOH | 1.2300 | TEOS | 0.0279 | EG | 98.7421 | 3.46 | 23.3 |

TABLE 4

| | | Introduction flow rate (liquid feed flow rate) [ml/min] | | | Introduction temperature (liquid feed temperature) [° C.] | | | Introduction pressure (liquid feed pressure) [MPaG] | | | Discharged liquid | | (Si/M) [molar ratio] | | | |
|---|---|---|---|---|---|---|---|---|---|---|---|---|---|---|---|---|
| | | | | | | | | | | | | | [Calculated value] | | [EDS] | |
| | | Liquid A | Liquid B | Liquid C | Liquid A | Liquid B | Liquid C | Liquid A | Liquid B | Liquid C | pH | Temperature [° C.] | Si | M | Si | M |
| Example | 1-1 | 500 | 30 | 85 | 19 | 17 | 18 | 0.109 | 0.20 | 0.20 | 9.56 | 24.3 | 10.7 | 89.3 | 10.8 | 89.2 |
| | 1-2 | 500 | 30 | 85 | 40 | 38 | 39 | 0.112 | 0.20 | 0.20 | 9.61 | 23.9 | 10.7 | 89.3 | 10.6 | 89.4 |
| | 1-3 | 500 | 30 | 85 | 61 | 62 | 59 | 0.114 | 0.20 | 0.20 | 9.59 | 24.1 | 10.7 | 89.3 | 10.8 | 89.2 |
| | 1-4 | 500 | 30 | 85 | 19 | 17 | 18 | 0.121 | 0.20 | 0.20 | 7.86 | 23.8 | 10.7 | 89.3 | 10.8 | 89.2 |
| | 1-5 | 500 | 30 | 85 | 20 | 18 | 17 | 0.121 | 0.20 | 0.20 | 11.34 | 24.2 | 10.7 | 89.3 | 10.6 | 89.4 |
| | 1-6 | 500 | 30 | 85 | 19 | 18 | 17 | 0.112 | 0.20 | 0.20 | 13.14 | 23.7 | 10.7 | 89.3 | 10.8 | 89.2 |
| | 1-7 | 500 | 50 | 100 | 151 | 87 | 113 | 0.118 | 0.20 | 0.20 | 11.75 | 32.5 | 10.7 | 89.3 | 10.9 | 89.1 |
| | 1-8 | 500 | 50 | 100 | 189 | 89 | 114 | 0.116 | 0.20 | 0.20 | 11.48 | 28.6 | 10.7 | 89.3 | 10.6 | 89.4 |
| | 1-9 | 500 | 50 | 100 | 234 | 89 | 113 | 0.114 | 0.20 | 0.20 | 11.65 | 29.0 | 10.7 | 89.3 | 10.5 | 89.5 |

With Example 1-1 to Example 1-3, the treatment temperature in the process of precipitating the fine metal particles and making the fluid containing the silicon compound (silicon compound raw material liquid) act on the fine metal particles was changed for a purpose of changing the ratio of Si—OH bonds or the ratio of Si—OH bonds/Si—O bonds. With Example 1-4 to Example 1-6, the pH in the process of precipitating the metal particles and making the fluid containing the silicon compound act on the fine metal particles was changed by changing the concentration of sulfuric acid contained in the fluid containing the silicon compound with respect to that of Example 1-1. With Example 1-7 to Example 1-9, the formulations of the metal raw material liquid, metal precipitation solvent, and the silicon compound raw material liquid were changed and the treatment temperature was changed.

As a further example of changing treatment of the functional groups contained in the silicon-compound-coated fine silver particles, hydrogen peroxide was made to act on the silicon-compound-coated fine silver particles obtained in Example 1-1. Specifically, the silicon-compound-coated fine silver particles obtained in Example 1-1 were charged into propylene glycol such as to be 0.1% by weight as silicon-compound-coated fine silver particles, and using the high-speed rotation-type dispersion emulsifier CLEARMIX (product name: CLM-2.2S, manufactured by M Technique Co., Ltd.) stirring at a rotor rotational speed of 20,000 rpm was performed for 30 minutes at a preparation temperature of 30° C. to mix and disperse homogenously and thereby prepare a silicon-compound-coated fine silver particle dispersion liquid. While using CLEARMIX to stir the dispersion liquid at 20,000 rpm, a 35% by weight hydrogen peroxide water (manufactured by KANTO CHEMICAL CO., INC.) was charged in, and the treatment was continued for 30 minutes while keeping the rotational speed of CLEARMIX at 20,000 rpm and the treatment temperature at 30° C. to 35° C. After the end of the treatment, a dried powder and a wet cake sample of the silicon-compound-coated fine silver particles were prepared by the same methods as for Example 1-1 to Example 1-9. In regard to the charged amount of the hydrogen peroxide water, the hydrogen peroxide was charged such that the amount of the hydrogen peroxide with respect to the silver contained in the silicon-compound-coated fine silver particles would be 0.005 mol times in Example 1-10, 0.01 mol times in Example 1-11, and 0.1 mol in Example 1-12.

As a changing treatment of the functional groups contained in the silicon compound of the silicon-compound-coated fine silver particles, the silicon-compound-coated fine silver particles of Example 1-1 were heat-treated using an electric furnace. The heat treatment conditions were as follows: Example 1-1: untreated; Example 1-13: at 100° C. for 30 minutes; Example 1-14: at 200° C. for 30 minutes; and Example 1-15: at 300° C. for 30 minutes.

As a changing treatment of the functional groups contained in the silicon compound of the silicon-compound-coated fine silver particles, the silicon-compound-coated fine silver particles of Example 1-1 were treated inside a desiccator under a fuming sulfuric acid atmosphere to make sulfonic acid act on the Si—OH groups contained in the silicon-compound-coated silver particles and thereby introduce sulfonic groups. The heat treatment conditions were as follows: Example 1-1: untreated; Example 1-16: at room temperature (25° C.) for 120 minutes; and Example 1-17: at room temperature (25° C.) for 480 minutes.

Figure 2:
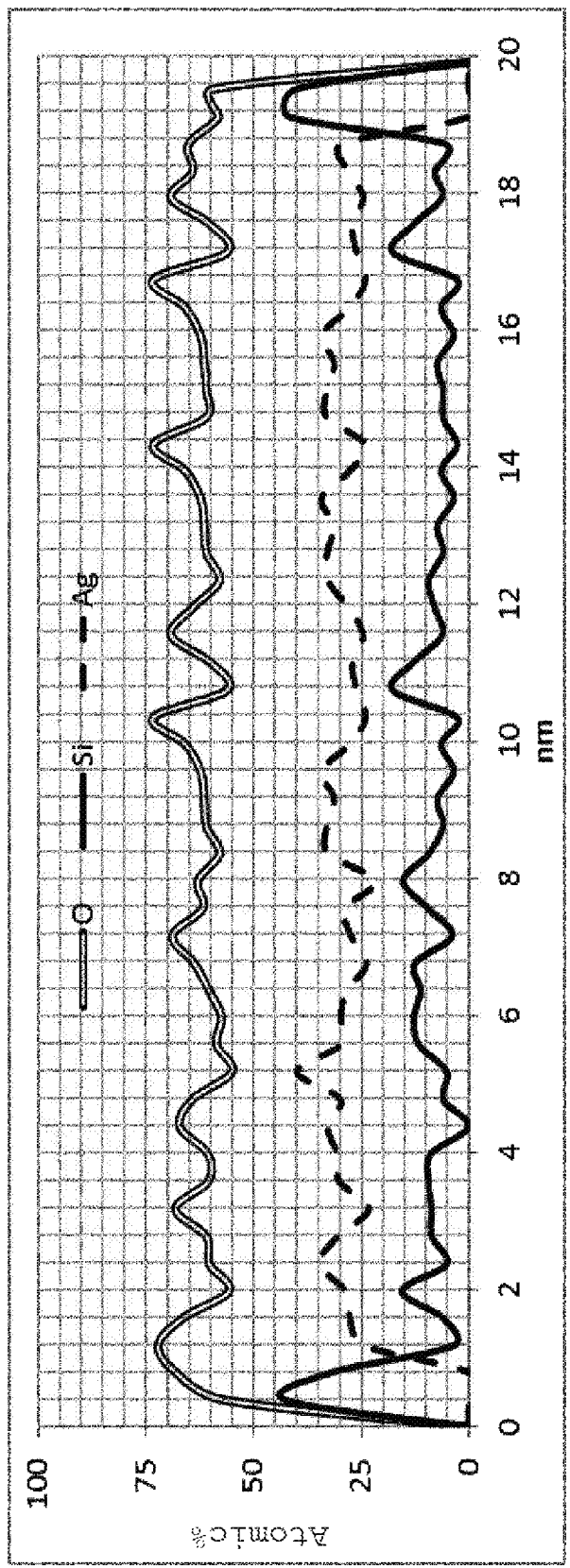
FIG. 2 is a diagram illustrating line analysis results of the silicon-compound-coated fine silver particle obtained in Example 1-1.

FIG. 1 shows STEM mapping results of a silicon-compound-coated fine silver particle obtained in Example 1-1 and FIG. 2 shows results of line analysis at a position indicated by a broken line in the HAADF image of FIG. 1. In FIG. 1, (a) is the dark field image (HAADF image), (b) is the mapping result of oxygen (O), (c) is the mapping result of silicon (Si), and (d) is the mapping result of zinc (Ag). FIG. 2 shows the results of line analysis at the position indicated by the broken line in the HAADF image of FIG. 1, the results indicating atomic % (mol %) of elements detected along the line segment from one end to the other end of the particle. As is evident from FIG. 2, whereas oxygen and silicon were detected up to both ends of the analytical range of the line analysis, silver was detected only up to parts several nm inward from the ends of the particle, and it can be understood that a surface of the fine silver particle is coated with the silicon compound that contains a silicon oxide. As is evident from FIG. 1 and FIG. 2, the silicon-compound-coated fine silver particle obtained in Example 1-1 was observed to be a fine silver particle, with which an entirety of the particle is covered with the silicon compound. Although STEM mapping and line analysis results, similar to those of Example 1-1, were also obtained for the silicon-compound-coated oxide particles obtained in Example 1-2 to Example 1-17, in regard to Example 1-6, a silicon-compound-coated fine silver particle was seen with which a silver particle is not covered entirely by the silicon compound but with which a surface of the fine silver particle is partially coated with the silicon compound that contains a silicon oxide. The present invention can be embodied as silicon-compound-coated fine metal particles, with which surfaces of metal particles are at least partially coated with a silicon compound. Also, with each of Example 1-9, Example 1-14, and Example 1-15, a hollow layer was seen between a fine silver particle and the silicon compound covering its surface.

Figure 3:
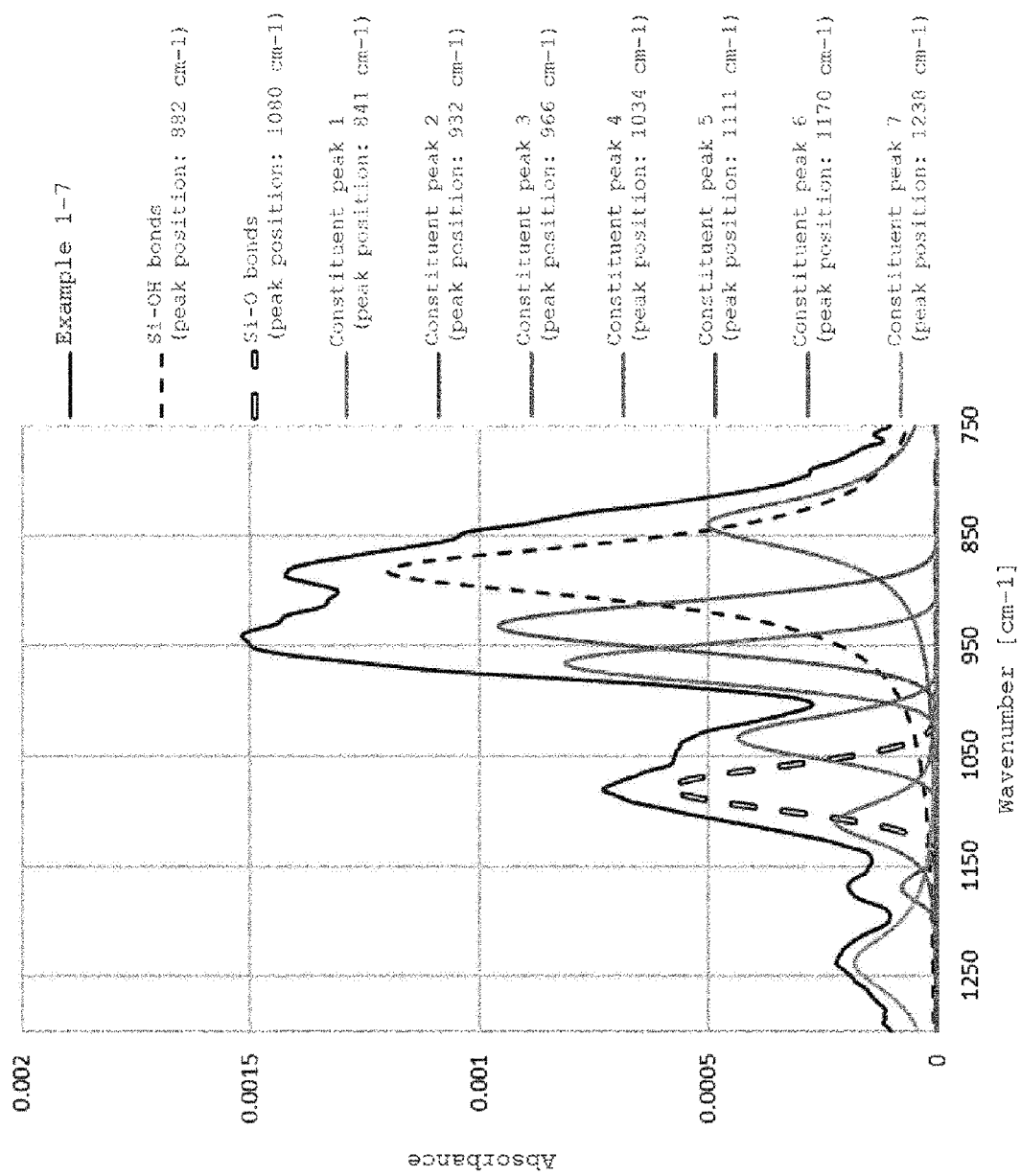
FIG. 3 is a diagram illustrating results of waveform separation in a wavenumber region of 750 cm$^{-1}$ to 1300 cm$^{-1}$ of FT-IR measurement results of silicon-compound-coated fine silver particles obtained in Example 1-7.

FIG. 3 shows the results of performing waveform separation on the wavenumber region of 750 $cm^{-1}$ to 1300 $cm^{-1}$ of the FT-IR measurement results for the silicon-compound-coated fine silver particles obtained in Example 1-7. As is evident from FIG. 3, with the present Example, as results of waveform separation of peaks in the wavenumber region of 750 $cm^{-1}$ to 1300 $cm^{-1}$, an Si—OH-bond-derived peak was deemed to be a peak attributed to a peak of greatest area ratio among Si—OH-bond-derived peaks, waveform-separated in a wavenumber region of 850 $cm^{-1}$ to 950 $cm^{-1}$, an Si—O-bond-derived peak was deemed to be a peak attributed to a peak of greatest area ratio among Si—O-bond-derived peaks, waveform-separated in a wavenumber region of 1000 $cm^{-1}$ or more and 1300 $cm^1$ or less, the ratio of Si—OH bonds was deemed to be a ratio of an area of the peak attributed to the Si—OH bonds with respect to a total area of peaks obtained by waveform separation of peaks in the wavenumber region of 750 $cm^{-1}$ to 1300 $cm^1$, the ratio of Si—O bonds was deemed to be a ratio of an area of the peak attributed to the Si—O bonds, and the ratio of Si—OH bonds and the ratio of Si—OH bonds/Si—O bonds were thereby calculated.

FIG. 4 shows XRD measurement results of the silicon-compound-coated fine silver particles obtained in Example 1-1. As is evident from FIG. 4, in the XRD measurement, only the peak derived from Ag was detected. It was thus confirmed that the silicon-oxide-containing silicon compound seen in each of the STEM and IR measurements is an amorphous silicon compound. Similar XRD measurement results were also obtained for Example 1-2 to Example 1-15.

The average primary particles diameters, the ratios of Si—OH bonds (Si—OH bonds ratios), the ratios of Si—O bonds (Si—O bonds ratios), and the ratios of Si—OH bonds/Si—O bonds (Si—OH bonds/Si—O bonds ratios) of the silicon-compound-coated fine silver particles obtained in Example 1-1 to Example 1-15 are shown in Table 5 together with results indicating, using volume average particle diameters resulting from particle size distribution measurements, dispersed particle diameters in dispersion liquids in which the silicon-compound-coated fine silver particles obtained in the respective Examples are dispersed in pure water or toluene (manufactured by KANTO CHEMICAL CO., INC.) as the dispersion medium. With the present Examples, dispersibility was evaluated as one of the properties of the silicon-compound-coated fine metal particles and the dispersibility was evaluated by the dispersed particle diameter and the dispersed particle diameter with respect to the average primary particle diameter (dispersed particle diameter/average primary particle diameter). In regard to the preparation of the dispersion liquids, the silicon-compound-coated fine silver particles were charged into each dispersion medium such as to be 0.1% by weight, and using CLEARMIX, stirring at a rotor rotational speed of 20,000 rpm was performed for 30 minutes at a preparation temperature of 30° C. to mix and disperse homogenously and thereby prepare each silicon-compound-coated fine silver particle dispersion liquid.

TABLE 5

| | | Average primary particle diameter [nm] | Si—OH bonds ratio [%] | Si—O bonds ratio [%] | Si—OH bonds/ Si—O bonds ratio | Dispersion state | | | |
|---|---|---|---|---|---|---|---|---|---|
| | | | | | | Dispersion medium 1: Pure water | | Dispersion medium 2: Toluene | |
| | | | | | | Dispersed particle diameter [nm] | Dispersed particle diameter/Average primary particle diameter | Dispersed particle diameter [nm] | Dispersed particle diameter/Average primary particle diameter |
| Example | 1-1 | 18.6 | 53.21 | 0.61 | 87.2295 | 59.4 | 3.2 | 87.6 | 4.7 |
| | 1-2 | 18.4 | 48.63 | 1.43 | 34.0070 | 66.5 | 3.6 | 85.3 | 4.6 |
| | 1-3 | 18.2 | 39.33 | 3.32 | 11.8464 | 68.4 | 3.8 | 82.1 | 4.5 |
| | 1-4 | 18.3 | 35.41 | 8.41 | 4.2105 | 71.0 | 3.9 | 75.4 | 4.1 |
| | 1-5 | 18.6 | 56.42 | 0.43 | 131.2093 | 54.6 | 2.9 | 88.6 | 4.8 |
| | 1-6 | 18.3 | 68.42 | 0.12 | 570.1667 | 51.9 | 2.8 | 93.6 | 5.1 |
| | 1-7 | 18.4 | 30.11 | 11.11 | 2.7102 | 74.4 | 4.0 | 68.9 | 3.7 |
| | 1-8 | 18.2 | 28.19 | 14.16 | 1.9908 | 78.9 | 4.3 | 66.8 | 3.7 |
| | 1-9 | 18.1 | 24.21 | 15.36 | 1.5762 | 88.4 | 4.9 | 64.3 | 3.6 |
| | 1-10 | 18.3 | 49.33 | 1.79 | 27.5587 | 64.1 | 3.5 | 86.4 | 4.7 |
| | 1-11 | 18.4 | 36.29 | 6.48 | 5.6003 | 69.3 | 3.8 | 77.4 | 4.2 |
| | 1-12 | 18.6 | 31.43 | 7.22 | 4.3532 | 72.1 | 3.9 | 71.2 | 3.8 |
| | 1-13 | 18.4 | 23.14 | 17.16 | 1.3485 | 92.3 | 5.0 | 61.2 | 3.3 |
| | 1-14 | 18.9 | 8.34 | 23.46 | 0.3555 | 113.1 | 6.0 | 41.2 | 2.2 |
| | 1-15 | 19.1 | 0.18 | 58.97 | 0.0031 | 324.0 | 17.0 | 38.6 | 2.0 |
| | 1-16 | 18.7 | 44.62 | 2.64 | 16.9015 | 67.4 | 3.6 | 86.4 | 4.6 |
| | 1-17 | 18.6 | 37.23 | 6.54 | 5.6927 | 70.1 | 3.8 | 79.4 | 4.3 |

As is evident from Table 5, a tendency that the dispersed particle diameter and the dispersed particle diameter/average primary particle diameter are decreased by the Si—OH bonds ratio and the Si—OH bonds/Si—O bonds ratio being increased was seen in the case of using pure water and ethanol as the dispersion medium, and a tendency that the dispersed particle diameter and the dispersed particle diameter/average primary particle diameter are decreased by the Si—OH bonds/Si—O bonds ratio being decreased was seen in the case of using toluene as the dispersion medium. Also, with Example 1-16 and Example 1-17, a sulfo group, which is a hydrophilic functional group, was seen in the IR measurement results, and by decrease of the Si—OH bonds ratio or the Si—OH bonds/Si—O bonds ratio, the dispersibility in pure water decreased and the dispersibility in toluene improved. FIG. 5 shows a TEM photograph observed using a collodion membrane prepared with an aqueous dispersion liquid of the silicon-compound-coated fine silver particles obtained in Example 1-1.

With Examples 2 to 4, silicon-compound-coated fine metal particles were prepared with the metal element in the silicon-compound-coated fine metal particles being changed (Example 2 and Example 3) or with the treatment apparatus being changed. Conditions, which differ in metal element or differ in treatment apparatus but are conditions that are the same in the branch number of the respective Examples, are conditions, with which, in the preparation of the silicon-compound-coated fine metal particles, the purpose is the same and the silicon-compound-coated fine metal particles are prepared or treated under similar conditions. The same applies to lists of analysis results and evaluation results of the respective Examples (Example 2: [Table 10], Example 3: [Table 15], Example 4: [Table 16]).

Example 2

For Example 2, silicon-compound-coated copper particles, with which surfaces of fine copper particles, as fine metal particles, are at least partially coated with a silicon compound, shall now be described. Other than the preparation conditions being as indicated in Table 6 to Table 9, preparation was performed under the same conditions as those of Example 1. The analysis results and the evaluation results of the obtained silicon-compound-coated fine copper particles are shown in Table 10. Regarding the substances indicated by chemical formulas and abbreviations indicated in Table 6 to Table 8, as $Cu(NO_3)_2 \cdot 3H_2O$, copper nitrate trihydrate (manufactured by Wako Pure Chemical Industries, Ltd.) was used as a substance differing from the substances indicated in Table 1 to Table 3, and other than this, the same substances as those of Example 1 were used.

Example 3

For Example 3, silicon-compound-coated nickel particles, with which surfaces of nickel particles, as fine metal particles, are at least partially coated with a silicon compound, shall now be described. Other than the preparation conditions being as indicated in Table 11 to Table 14, preparation was performed under the same conditions as those of Example 1. The analysis results and the evaluation results of the obtained silicon-compound-coated fine nickel particles are shown in Table 15. Regarding the substances indicated by chemical formulas and abbreviations indicated in Table 11 to Table 13, as $Ni(NO_3)_2 \cdot 6H_2O$, nickel nitrate hexahydrate (manufactured by KANTO CHEMICAL CO., INC.) was used as a substance differing from the substances indicated in Table 1 to Table 3 or Table 6 to Table 8, and other than this, the same substances as those of Example 1 or Example 2 were used.

Also with both Example 2 and Example 3, results similar to Example 1 were obtained as the STEM mapping and line analysis results and the XRD measurement results, only a peak derived from Cu was detected in the XRD measurement results for Example 2, and only a peak derived from Ni was detected in the XRD measurement results for Example 3.

As is evident from Table 10 and Table 15, results similar to Example 1 were also obtained for the silicon-compound-coated fine copper particles and the silicon-compound-coated fine nickel particles. It was found that even if the metal particles in the silicon-compound-coated fine metal particles are of metals of different types, the dispersibility of the silicon-compound-coated metal particles can be controlled in a range of Si—OH bonds ratio of 0.1% or more and 70% or less and in a range of Si—OH bonds/Si—O bonds ratio of 0.001 or more and 700 or less.

TABLE 6

| | | Formulation of the 1st fluid (Liquid A: metal raw material liquid) | | | | |
|---|---|---|---|---|---|---|
| | | Formulation | | | | |
| | | Raw material | [wt %] | Raw material | [wt %] | pH | pH [° C.] |
| Example | 2-1 $Cu(NO_3)_2 \cdot 3H_2O$ | 0.213 | Pure water | 99.787 | 3.86 | 16.3 |
| | 2-2 $Cu(NO_3)_2 \cdot 3H_2O$ | 0.213 | Pure water | 99.787 | 3.86 | 16.3 |
| | 2-3 $Cu(NO_3)_2 \cdot 3H_2O$ | 0.213 | Pure water | 99.787 | 3.86 | 16.3 |
| | 2-4 $Cu(NO_3)_2 \cdot 3H_2O$ | 0.213 | Pure water | 99.787 | 3.86 | 16.3 |
| | 2-5 $Cu(NO_3)_2 \cdot 3H_2O$ | 0.213 | Pure water | 99.787 | 3.86 | 16.3 |
| | 2-6 $Cu(NO_3)_2 \cdot 3H_2O$ | 0.213 | Pure water | 99.787 | 3.86 | 16.3 |
| | 2-7 $Cu(NO_3)_2 \cdot 3H_2O$ | 0.054 | EG | 99.946 | 2.84 | 20.9 |
| | 2-8 $Cu(NO_3)_2 \cdot 3H_2O$ | 0.054 | EG | 99.946 | 2.84 | 20.9 |
| | 2-9 $Cu(NO_3)_2 \cdot 3H_2O$ | 0.054 | EG | 99.946 | 2.84 | 20.9 |

TABLE 7

Formulation of the 2nd fluid
(Liquid B: metal precipitation solvent)

| | | Formulation | | | | | | | | | | | pH | |
|---|---|---|---|---|---|---|---|---|---|---|---|---|---|---|
| | | Raw material | [wt %] | Raw material | [wt %] | Raw material | [wt %] | Raw material | [wt %] | Raw material | [wt %] | Raw material | [wt %] | pH | [° C.] |
| Example | 2-1 | $NaBH_4$ | 0.650 | NaOH | 1.000 | Pure water | 98.350 | — | 0.000 | — | 0.000 | — | 0.000 | >14 | — |
| | 2-2 | $NaBH_4$ | 0.650 | NaOH | 1.000 | Pure water | 98.350 | — | 0.000 | — | 0.000 | — | 0.000 | >14 | — |
| | 2-3 | $NaBH_4$ | 0.650 | NaOH | 1.000 | Pure water | 98.350 | — | 0.000 | — | 0.000 | — | 0.000 | >14 | — |
| | 2-4 | $NaBH_4$ | 0.650 | NaOH | 1.000 | Pure water | 98.350 | — | 0.000 | — | 0.000 | — | 0.000 | >14 | — |
| | 2-5 | $NaBH_4$ | 0.650 | NaOH | 1.000 | Pure water | 98.350 | — | 0.000 | — | 0.000 | — | 0.000 | >14 | — |
| | 2-6 | $NaBH_4$ | 0.650 | NaOH | 1.000 | Pure water | 98.350 | — | 0.000 | — | 0.000 | — | 0.000 | >14 | — |
| | 2-7 | HMH | 20.00 | PVP | 9.75 | DMAE | 5.00 | KOH | 2.55 | Pure water | 7.45 | EG | 55.25 | >14 | — |
| | 2-8 | HMH | 20.00 | PVP | 9.75 | DMAE | 5.00 | KOH | 2.55 | Pure water | 7.45 | EG | 55.25 | >14 | — |
| | 2-9 | HMH | 20.00 | PVP | 9.75 | DMAE | 5.00 | KOH | 2.55 | Pure water | 7.45 | EG | 55.25 | >14 | — |

TABLE 8

Formulation of the 3rd fluid
(Liquid C: silicon compound raw material liquid)

| | | Formulation | | | | | | pH | |
|---|---|---|---|---|---|---|---|---|---|
| | | Raw material | [wt %] | Raw material | [wt %] | Raw material | [wt %] | pH | [° C.] |
| Example | 2-1 | $H_2SO_4$ | 0.3100 | TEOS | 0.1300 | MeOH | 99.5600 | 1.75 | 14.4 |
| | 2-2 | $H_2SO_4$ | 0.3100 | TEOS | 0.1300 | MeOH | 99.5600 | 1.75 | 14.4 |
| | 2-3 | $H_2SO_4$ | 0.3100 | TEOS | 0.1300 | MeOH | 99.5600 | 1.75 | 14.4 |
| | 2-4 | $H_2SO_4$ | 0.4320 | TEOS | 0.1300 | MeOH | 99.4380 | 0.26 | 13.6 |
| | 2-5 | $H_2SO_4$ | 0.2340 | TEOS | 0.1300 | MeOH | 99.6360 | 1.89 | 14.3 |
| | 2-6 | $H_2SO_4$ | 0.0560 | TEOS | 0.1300 | MeOH | 99.8140 | 2.84 | 15.1 |
| | 2-7 | MeOH | 1.2300 | TEOS | 0.0279 | EG | 98.7421 | 3.46 | 23.3 |
| | 2-8 | MeOH | 1.2300 | TEOS | 0.0279 | EG | 98.7421 | 3.46 | 23.3 |
| | 2-9 | MeOH | 1.2300 | TEOS | 0.0279 | EG | 98.7421 | 3.46 | 23.3 |

TABLE 9

| | | Introduction flow rate (liquid feed flow rate) [ml/min] | | | Introduction temperature (liquid feed temperature) [° C.] | | | Introduction pressure (liquid feed pressure) [MPaG] | | | Discharged liquid | | Si/M [molar ratio] [Calculated value] | | [EDS] | |
|---|---|---|---|---|---|---|---|---|---|---|---|---|---|---|---|---|
| | | Liquid A | Liquid B | Liquid C | Liquid A | Liquid B | Liquid C | Liquid A | Liquid B | Liquid C | pH | Temperature [° C.] | Si | M | Si | M |
| Example | 2-1 | 500 | 30 | 85 | 21 | 18 | 17 | 0.111 | 0.20 | 0.20 | 9.89 | 23.3 | 10.7 | 89.3 | 10.8 | 89.2 |
| | 2-2 | 500 | 30 | 85 | 39 | 40 | 40 | 0.109 | 0.20 | 0.20 | 9.91 | 23.4 | 10.7 | 89.3 | 10.6 | 89.4 |
| | 2-3 | 500 | 30 | 85 | 60 | 61 | 60 | 0.113 | 0.20 | 0.20 | 9.87 | 23.1 | 10.7 | 89.3 | 10.8 | 89.2 |
| | 2-4 | 500 | 30 | 85 | 19 | 18 | 19 | 0.119 | 0.20 | 0.20 | 7.76 | 23.4 | 10.7 | 89.3 | 10.9 | 89.1 |
| | 2-5 | 500 | 30 | 85 | 19 | 19 | 18 | 0.122 | 0.20 | 0.20 | 11.28 | 23.9 | 10.7 | 89.3 | 10.8 | 89.2 |
| | 2-6 | 500 | 30 | 85 | 20 | 20 | 19 | 0.114 | 0.20 | 0.20 | 13.28 | 23.1 | 10.7 | 89.3 | 10.9 | 89.1 |

TABLE 9-continued

| | | Introduction flow rate (liquid feed flow rate) [ml/min] | | | Introduction temperature (liquid feed temperature) [° C.] | | | Introduction pressure (liquid feed pressure) [MPaG] | | | Discharged liquid | | Si/M [molar ratio] | | | |
|---|---|---|---|---|---|---|---|---|---|---|---|---|---|---|---|---|
| | | | | | | | | | | | | | | [Calculated value] | | [EDS] | |
| | | Liquid A | Liquid B | Liquid C | Liquid A | Liquid B | Liquid C | Liquid A | Liquid B | Liquid C | pH | Temperature [° C.] | Si | M | Si | M |
| | 2-7 | 500 | 50 | 100 | 150 | 88 | 111 | 0.121 | 0.20 | 0.20 | 11.71 | 29.3 | 10.7 | 89.3 | 10.8 | 89.2 |
| | 2-8 | 500 | 50 | 100 | 191 | 91 | 113 | 0.117 | 0.20 | 0.20 | 11.49 | 29.1 | 10.7 | 89.3 | 10.9 | 89.1 |
| | 2-9 | 500 | 50 | 100 | 231 | 90 | 115 | 0.116 | 0.20 | 0.20 | 11.67 | 28.9 | 10.7 | 89.3 | 10.8 | 89.2 |

TABLE 10

| | | Average primary particle diameter [nm] | Si—OH bonds ratio [%] | Si—O bonds ratio [%] | Si—OH bonds/Si—O bonds ratio | Dispersion state | | | |
|---|---|---|---|---|---|---|---|---|---|
| | | | | | | Dispersion medium 1: Pure water | | Dispersion medium 2: Toluene | |
| | | | | | | Dispersed particle diameter [nm] | Dispersed particle diameter/Average primary particle diameter | Dispersed particle diameter [nm] | Dispersed particle diameter/Average primary particle diameter |
| Example | 2-1 | 21.2 | 53.14 | 0.48 | 110.71 | 58.9 | 2.8 | 86.3 | 4.1 |
| | 2-2 | 22.3 | 48.71 | 1.28 | 38.055 | 65.9 | 3.0 | 84.3 | 3.8 |
| | 2-3 | 22.1 | 39.11 | 3.46 | 11.303 | 69.1 | 3.1 | 81.2 | 3.7 |
| | 2-4 | 21.1 | 35.34 | 8.48 | 4.1675 | 72.6 | 3.4 | 74.9 | 3.5 |
| | 2-5 | 21.3 | 56.14 | 0.31 | 181.10 | 55.7 | 2.6 | 87.6 | 4.1 |
| | 2-6 | 20.9 | 68.14 | 0.11 | 619.5 | 52.3 | 2.5 | 91.2 | 4.4 |
| | 2-7 | 21.3 | 30.43 | 10.62 | 2.865 | 75.1 | 3.5 | 67.3 | 3.2 |
| | 2-8 | 22.6 | 28.39 | 13.84 | 2.051 | 79.9 | 3.5 | 65.4 | 2.9 |
| | 2-9 | 21.6 | 24.18 | 15.26 | 1.585 | 89.1 | 4.1 | 60.9 | 2.8 |
| | 2-10 | 21.3 | 48.97 | 1.81 | 27.055 | 64.3 | 3.0 | 85.4 | 4.0 |
| | 2-11 | 20.9 | 35.98 | 6.51 | 5.5269 | 68.9 | 3.3 | 77.2 | 3.7 |
| | 2-12 | 21.6 | 31.36 | 7.24 | 4.3315 | 72.6 | 3.4 | 71.9 | 3.3 |
| | 2-13 | 22.1 | 23.36 | 17.21 | 1.3574 | 91.9 | 4.2 | 59.8 | 2.7 |
| | 2-14 | 21.4 | 9.14 | 23.54 | 0.3883 | 112.3 | 5.2 | 42.6 | 2.0 |
| | 2-15 | 21.6 | 0.45 | 59.19 | 0.0076 | 223.6 | 10.4 | 41.1 | 1.9 |

TABLE 11

| | | Formulation of the 1st fluid (Liquid A: metal raw material liquid) | | | | pH | [° C.] |
|---|---|---|---|---|---|---|---|
| | | Formulation | | | | | |
| | | Raw material | [wt %] | Raw material | [wt %] | | |
| Example | 3-1 | Ni(NO$_3$)$_2$·6H$_2$O | 0.257 | Pure water | 99.743 | 3.86 | 16.3 |
| | 3-2 | Ni(NO$_3$)$_2$·6H$_2$O | 0.257 | Pure water | 99.743 | 3.86 | 16.3 |
| | 3-3 | Ni(NO$_3$)$_2$·6H$_2$O | 0.257 | Pure water | 99.743 | 3.86 | 16.3 |
| | 3-4 | Ni(NO$_3$)$_2$·6H$_2$O | 0.257 | Pure water | 99.743 | 3.86 | 16.3 |
| | 3-5 | Ni(NO$_3$)$_2$·6H$_2$O | 0.257 | Pure water | 99.743 | 3.86 | 16.3 |
| | 3-6 | Ni(NO$_3$)$_2$·6H$_2$O | 0.257 | Pure water | 99.743 | 3.86 | 16.3 |
| | 3-7 | Ni(NO$_3$)$_2$·6H$_2$O | 0.065 | EG | 99.935 | 2.74 | 20.1 |
| | 3-8 | Ni(NO$_3$)$_2$·6H$_2$O | 0.065 | EG | 99.935 | 2.74 | 20.1 |
| | 3-9 | Ni(NO$_3$)$_2$·6H$_2$O | 0.065 | EG | 99.935 | 2.74 | 20.1 |

TABLE 12

Formulation of the 2nd fluid
(Liquid B: metal precipitation solvent)

| | | Formulation | | | | | | | | | | | pH | |
|---|---|---|---|---|---|---|---|---|---|---|---|---|---|---|
| | | Raw material | [wt %] | Raw material | [wt %] | Raw material | [wt %] | Raw material | [wt %] | Raw material | [wt %] | Raw material | [wt %] | pH | [° C.] |
| Example | 3-1 | NaBH$_4$ | 0.650 | NaOH | 1.000 | Pure water | 98.350 | — | 0.000 | — | 0.000 | — | 0.000 | >14 | — |
| | 3-2 | NaBH$_4$ | 0.650 | NaOH | 1.000 | Pure water | 98.350 | — | 0.000 | — | 0.000 | — | 0.000 | >14 | — |
| | 3-3 | NaBH$_4$ | 0.650 | NaOH | 1.000 | Pure water | 98.350 | — | 0.000 | — | 0.000 | — | 0.000 | >14 | — |
| | 3-4 | NaBH$_4$ | 0.650 | NaOH | 1.000 | Pure water | 98.350 | — | 0.000 | — | 0.000 | — | 0.000 | >14 | — |
| | 3-5 | NaBH$_4$ | 0.650 | NaOH | 1.000 | Pure water | 98.350 | — | 0.000 | — | 0.000 | — | 0.000 | >14 | — |
| | 3-6 | NaBH$_4$ | 0.650 | NaOH | 1.000 | Pure water | 98.350 | — | 0.000 | — | 0.000 | — | 0.000 | >14 | — |
| | 3-7 | HMH | 20.00 | PVP | 9.75 | DMAE | 5.00 | KOH | 2.55 | Pure water | 7.45 | EG | 55.25 | >14 | — |
| | 3-8 | HMH | 20.00 | PVP | 9.75 | DMAE | 5.00 | KOH | 2.55 | Pure water | 7.45 | EG | 55.25 | >14 | — |
| | 3-9 | HMH | 20.00 | PVP | 9.75 | DMAE | 5.00 | KOH | 2.55 | Pure water | 7.45 | EG | 55.25 | >14 | — |

TABLE 13

Formulation of the 3rd fluid
(Liquid C: silicon compound raw material liquid)

| | | Formulation | | | | | | pH | |
|---|---|---|---|---|---|---|---|---|---|
| | | Raw material | [wt %] | Raw material | [wt %] | Raw material | [wt %] | pH | [° C.] |
| Example | 3-1 | H$_2$SO$_4$ | 0.3100 | TEOS | 0.1300 | MeOH | 99.5600 | 1.75 | 14.4 |
| | 3-2 | H$_2$SO$_4$ | 0.3100 | TEOS | 0.1300 | MeOH | 99.5600 | 1.75 | 14.4 |
| | 3-3 | H$_2$SO$_4$ | 0.3100 | TEOS | 0.1300 | MeOH | 99.5600 | 1.75 | 14.4 |
| | 3-4 | H$_2$SO$_4$ | 0.4320 | TEOS | 0.1300 | MeOH | 99.4380 | 0.26 | 13.6 |
| | 3-5 | H$_2$SO$_4$ | 0.2340 | TEOS | 0.1300 | MeOH | 99.6360 | 1.89 | 14.3 |
| | 3-6 | H$_2$SO$_4$ | 0.0560 | TEOS | 0.1300 | MeOH | 99.8140 | 2.84 | 15.1 |
| | 3-7 | MeOH | 1.2300 | TEOS | 0.0279 | EG | 98.7421 | 3.46 | 23.3 |
| | 3-8 | MeOH | 1.2300 | TEOS | 0.0279 | EG | 98.7421 | 3.46 | 23.3 |
| | 3-9 | MeOH | 1.2300 | TEOS | 0.0279 | EG | 98.7421 | 3.46 | 23.3 |

TABLE 14

| | | Introduction flow rate (liquid feed flow rate) [ml/min] | | | Introduction temperature (liquid feed temperature) [° C.] | | | Introduction pressure (liquid feed pressure) [MPaG] | | | Discharged liquid | | Si/M [molar ratio] [Calculated value] | | [EDS] | |
|---|---|---|---|---|---|---|---|---|---|---|---|---|---|---|---|---|
| | | Liquid A | Liquid B | Liquid C | Liquid A | Liquid B | Liquid C | Liquid A | Liquid B | Liquid C | pH | Temperature [° C.] | Si | M | Si | M |
| Ex- | 3-1 | 500 | 30 | 85 | 20 | 19 | 16 | 0.119 | 0.20 | 0.20 | 9.89 | 23.3 | 10.7 | 89.3 | 10.8 | 89.2 |
| ample | 3-2 | 500 | 30 | 85 | 42 | 41 | 39 | 0.122 | 0.20 | 0.20 | 9.91 | 23.4 | 10.7 | 89.3 | 10.8 | 89.2 |
| | 3-3 | 500 | 30 | 85 | 59 | 60 | 62 | 0.119 | 0.20 | 0.20 | 9.87 | 23.1 | 10.7 | 89.3 | 10.6 | 89.4 |

TABLE 14-continued

| | | Introduction flow rate (liquid feed flow rate) [ml/min] | | | Introduction temperature (liquid feed temperature) [° C.] | | | Introduction pressure (liquid feed pressure) [MPaG] | | | Discharged liquid | | Si/M [molar ratio] [Calculated value] | | [EDS] | |
|---|---|---|---|---|---|---|---|---|---|---|---|---|---|---|---|---|
| | | Liquid A | Liquid B | Liquid C | Liquid A | Liquid B | Liquid C | Liquid A | Liquid B | Liquid C | pH | Temperature [° C.] | Si | M | Si | M |
| | 3-4 | 500 | 30 | 85 | 20 | 19 | 18 | 0.122 | 0.20 | 0.20 | 7.76 | 23.4 | 10.7 | 89.3 | 10.8 | 89.2 |
| | 3-5 | 500 | 30 | 85 | 18 | 20 | 19 | 0.114 | 0.20 | 0.20 | 11.28 | 23.9 | 10.7 | 89.3 | 10.8 | 89.2 |
| | 3-6 | 500 | 30 | 85 | 21 | 18 | 19 | 0.114 | 0.20 | 0.20 | 13.28 | 23.1 | 10.7 | 89.3 | 10.6 | 89.4 |
| | 3-7 | 500 | 50 | 100 | 153 | 86 | 110 | 0.114 | 0.20 | 0.20 | 11.71 | 29.3 | 10.7 | 89.3 | 10.8 | 89.2 |
| | 3-8 | 500 | 50 | 100 | 193 | 90 | 111 | 0.119 | 0.20 | 0.20 | 11.49 | 29.1 | 10.7 | 89.3 | 10.5 | 89.5 |
| | 3-9 | 500 | 50 | 100 | 234 | 91 | 113 | 0.122 | 0.20 | 0.20 | 11.67 | 28.9 | 10.7 | 89.3 | 10.8 | 89.2 |

TABLE 15

| | | Average primary particle diameter [nm] | Si—OH bonds ratio [%] | Si—O bonds ratio [%] | Si—OH bonds/Si—O bonds ratio | Dispersion state | | | |
|---|---|---|---|---|---|---|---|---|---|
| | | | | | | Dispersion medium 1: Pure water | | Dispersion medium 2: Toluene | |
| | | | | | | Dispersed particle diameter [nm] | Dispersed particle diameter/Average primary particle diameter | Dispersed particle diameter [nm] | Dispersed particle diameter/Average primary particle diameter |
| Example | 3-1 | 32.1 | 52.99 | 0.41 | 129.2 | 56.9 | 1.8 | 87.3 | 2.7 |
| | 3-2 | 33.1 | 49.54 | 1.43 | 34.6 | 63.9 | 1.9 | 85.3 | 2.6 |
| | 3-3 | 33.1 | 38.87 | 3.28 | 11.9 | 67.1 | 2.0 | 82.2 | 2.5 |
| | 3-4 | 32.4 | 35.49 | 8.54 | 4.2 | 70.6 | 2.2 | 75.9 | 2.3 |
| | 3-5 | 31.3 | 55.84 | 0.24 | 232.7 | 53.7 | 1.7 | 88.6 | 2.8 |
| | 3-6 | 32.3 | 68.27 | 0.14 | 487.6 | 49.3 | 1.5 | 91.2 | 2.8 |
| | 3-7 | 33.4 | 31.28 | 10.28 | 3.0 | 72.1 | 2.2 | 65.9 | 2.0 |
| | 3-8 | 31.9 | 27.54 | 14.23 | 1.9 | 77.9 | 2.4 | 63.2 | 2.0 |
| | 3-9 | 33.9 | 23.84 | 15.46 | 1.5 | 87.9 | 2.6 | 57.7 | 1.7 |
| | 3-10 | 32.6 | 48.64 | 1.76 | 27.6364 | 63.9 | 2.0 | 84.9 | 2.6 |
| | 3-11 | 33.1 | 34.87 | 6.38 | 5.4655 | 69.1 | 2.1 | 76.9 | 2.3 |
| | 3-12 | 32.9 | 32.14 | 7.46 | 4.3083 | 73.2 | 2.2 | 72.3 | 2.2 |
| | 3-13 | 34.6 | 23.69 | 17.54 | 1.3506 | 92.1 | 2.7 | 60.1 | 1.7 |
| | 3-14 | 33.6 | 8.43 | 24.13 | 0.3494 | 114.6 | 3.4 | 45.6 | 1.4 |
| | 3-15 | 31.9 | 0.59 | 60.21 | 0.0098 | 396.3 | 12.4 | 42.1 | 1.3 |

Example 4

As Example 4, silicon-compound-coated silver particles were prepared with conditions being the same as those in Example 1 with the exception of employing the apparatus and procedures described in Publication of JP 2009-112892 for mixing and reacting a liquid A, a liquid B, and liquid C. Here, as the apparatus of Publication of JP 2009-112892, the apparatus described in FIG. 1 of that publication was used, with the inner diameter of the stirring tank being 80 mm, the gap between the outer end of the stirring tool and the inner peripheral side surface of the stirring tank being 0.5 mm, and the rotational speed of the stirring blade being 7,200 rpm. Also, the liquid A was introduced into the stirring tank, and the liquid B was then added to a thin film composed of the liquid A being pressed against the inner peripheral side surface of the stirring tank to make the liquids become mixed and react with each other.

Results similar to Example 1 were obtained as the STEM mapping and line analysis results and the XRD measurement results.

The analysis results and the evaluation results for the silicon-compound-coated fine silver particles obtained in Example 4 are shown in Table 16. As is evident from Table 16, it was found that even with Example 4, which was carried out using an apparatus differing from the apparatus described in Patent Literature 5, the dispersibility can be controlled by controlling the Si—OH bonds ratio or the Si—OH bonds/Si—O bonds ratio in the silicon-compound-coated fine metal particles as in Examples 1 to 3.

TABLE 16

| | | | | | Dispersion state | | | |
|---|---|---|---|---|---|---|---|---|
| | | | | | Dispersion medium 1: Pure water | | Dispersion medium 2: Toluene | |
| | Average primary particle diameter [nm] | Si—OH bonds ratio [%] | Si—O bonds ratio [%] | Si—OH bonds/Si—O bonds ratio | Dispersed particle diameter [nm] | Dispersed particle diameter/ Average primary particle diameter | Dispersed particle diameter [nm] | Dispersed particle diameter/ Average primary particle diameter |
| Example 4-1 | 64.3 | 52.96 | 0.63 | 84.0635 | 146.1 | 2.3 | 195.3 | 3.0 |
| 4-2 | 66.9 | 47.89 | 1.44 | 33.2569 | 163.5 | 2.4 | 190.2 | 2.8 |
| 4-3 | 65.9 | 38.29 | 3.42 | 11.1959 | 168.3 | 2.6 | 183.1 | 2.8 |
| 4-4 | 65.4 | 34.91 | 8.16 | 4.2782 | 174.5 | 2.7 | 168.1 | 2.6 |
| 4-5 | 67.4 | 55.36 | 0.39 | 141.9487 | 134.3 | 2.0 | 206.1 | 3.1 |
| 4-6 | 68.1 | 67.39 | 0.18 | 374.3889 | 127.7 | 1.9 | 208.7 | 3.1 |
| 4-7 | 65.1 | 29.98 | 10.76 | 2.7862 | 183.0 | 2.8 | 153.6 | 2.4 |
| 4-8 | 65.6 | 27.08 | 13.79 | 1.9637 | 194.1 | 3.0 | 149.0 | 2.3 |
| 4-9 | 66.3 | 23.46 | 14.97 | 1.5671 | 217.3 | 3.3 | 143.4 | 2.2 |
| 4-10 | 68.1 | 48.61 | 1.65 | 29.4606 | 157.8 | 2.3 | 192.7 | 2.8 |
| 4-11 | 67.2 | 35.89 | 6.51 | 5.5131 | 170.5 | 2.5 | 172.6 | 2.6 |
| 4-12 | 64.3 | 30.97 | 7.46 | 4.0515 | 177.4 | 2.8 | 158.8 | 2.5 |
| 4-13 | 65.1 | 29.97 | 17.29 | 1.7334 | 181.2 | 2.8 | 153.4 | 2.4 |
| 4-14 | 68.9 | 8.46 | 24.51 | 0.3452 | 278.2 | 4.0 | 91.9 | 1.3 |
| 4-15 | 67.3 | 0.89 | 59.14 | 0.0150 | 364.2 | 5.4 | 82.1 | 1.2 |

Example 5

As Example 5, an example of producing silicon-compound-coated fine metal particles using silicon-compound-coated precursor particles and controlling the ratio of Si—OH bonds or the ratio of Si—OH bonds/Si—O bonds shall now be described. As the silicon-compound-coated fine precursor particles, silicon-compound-coated, silicon-aluminum-doped fine iron oxide particles were prepared. In regard to the preparation conditions, besides preparing based on the formulation conditions indicated in Table 17 to Table 19 and using the treatment conditions indicated in Table 20, the silicon-compound-coated, silicon-aluminum-doped fine iron oxide particles were prepared by the same method as that of Example 1. Oxide particles are prepared in an initial stage of Example 5 and therefore the metal raw material liquid is indicated as an oxide raw material liquid and the metal precipitation solvent is indicated as an oxide precipitation solvent. Regarding the substances indicated by chemical formulas and abbreviations indicated in Table 17 to Table 19, as $Fe(NO_3)_3 \cdot 9H_2O$, iron nitrate nonahydrate (manufactured by KANTO CHEMICAL CO., INC.) was used and, as $Al(NO_3)_3 \cdot 9H_2O$, aluminum nitrate nonahydrate (manufactured by KANTO CHEMICAL CO., INC.) was used as substances differing from the substances indicated in Table 1 to Table, Table 6 to Table 8, or Table 11 to Table 13, and other than these, the same substances as those of Example 1 to Example 4 were used.

TABLE 17

| | Formulation of the 1st fluid (Liquid A: oxide raw material liquid) | | | | | | | | | |
|---|---|---|---|---|---|---|---|---|---|---|
| | Formulation | | | | | | | | pH | |
| | Raw material | [wt %] | Raw material | [wt %] | Raw material | [wt %] | Raw material | [wt %] | pH | [° C.] |
| Example 5 | $Fe(NO_3)_3 \cdot 9H_2O$ | 3.000 | TEOS | 0.286 | $Al(NO_3)_3 \cdot 9H_2O$ | 0.056 | Pure water | 96.658 | 0.48 | 19.3 |

TABLE 18

Formulation of the 2nd fluid
(Liquid B: oxide precipitation solvent)

| | | Formulation | | | |
|---|---|---|---|---|---|
| | Raw material | [wt %] | Raw material | [wt %] | pH | pH [° C.] |
| Example 5 | NaOH | 13.50 | Pure water | 86.50 | >14 | — |

TABLE 19

Formulation of the 3rd fluid
(Liquid C: silicon compound raw material liquid)

| | | Formulation | | | |
|---|---|---|---|---|---|
| | Raw material | [wt %] | Raw material | [wt %] | pH | pH [° C.] |
| Example 5 | MeOH | 99.5361 | TEOS | 0.4639 | 4.98 | 19.1 |

TABLE 20

| | Introduction flow rate (liquid feed flow rate) [ml/min] | | | Introduction temperature (liquid feed temperature) [° C.] | | | Introduction pressure (liquid feed pressure) [MPaG] | | | Discharged liquid | | Si (core + shell)/M (Fe + Al) [molar ratio] | | | |
|---|---|---|---|---|---|---|---|---|---|---|---|---|---|---|---|
| | | | | | | | | | | | | [Calculated value] | | [EDS] | |
| | Liquid A | Liquid B | Liquid C | Liquid A | Liquid B | Liquid C | Liquid A | Liquid B | Liquid C | pH | Temperature [° C.] | Si | M | Si | M |
| Example 5 | 400 | 40 | 50 | 141 | 89 | 88 | 0.415 | 0.20 | 0.20 | 11.69 | 23.9 | 6.8 | 93.2 | 6.9 | 93.1 |

The silicon-compound-coated, silicon-aluminum-doped fine iron oxide particles obtained in Example 5 were heat-treated inside a reducing furnace with an argon gas, containing hydrogen, being made to flow through the reducing furnace as a reducing atmosphere. Hydrogen concentration, treatment temperatures, and treatment times in the gas being made to flow through the reducing furnace, the average primary particles diameters, the ratios of Si—OH bonds (Si—OH bonds ratios), the ratios of Si—O bonds (Si—O bonds ratios), and the ratios of Si—OH bonds/Si—O bonds (Si—OH bonds/Si—O bonds ratios) of the silicon-compound-coated metal particles obtained are shown in Table 21 together with results indicating, using volume average particle diameters resulting from particle size distribution measurements, dispersed particle diameters in dispersion liquids in which the silicon-compound-coated fine metal particles obtained in the respective Examples are dispersed in pure water or toluene (manufactured by KANTO CHEMICAL CO., INC.) as the dispersion medium. (The results for Example 5-1 to Example 5-10 are those for silicon-compound-coated metal particles.)

TABLE 21

| | | Reducing atmosphere conditions | | | | Average primary particle diameter [nm] | Si—OH bonds ratio [%] | Si—O bonds ratio [%] | Si—OH bonds/Si—O bonds ratio | Dispersion state | | | |
|---|---|---|---|---|---|---|---|---|---|---|---|---|---|
| | | | | | | | | | | Dispersion medium 1: Pure water | | Dispersion medium 2: Toluene | |
| | | Hydrogen concentration [%] | Gas flow [L/min] | Treatment temperature [° C.] | Treatment time [min] | | | | | Dispersed particle diameter [nm] | Dispersed particle diameter/ Average primary particle diameter | Dispersed particle diameter [nm] | Dispersed particle diameter/ Average primary particle diameter |
| Example | 5 | — | — | — | — | 9.5 | — | — | — | — | — | — | — |
| | 5-1 | 3 | 5 | 400 | 30 | 23.1 | 58.8 | 6.7 | 8.78 | 51.9 | 2.2 | 165.4 | 7.2 |
| | 5-2 | 3 | 5 | 450 | 30 | 24.6 | 46.8 | 9.1 | 5.14 | 54.6 | 2.2 | 156.3 | 6.4 |
| | 5-3 | 3 | 5 | 500 | 30 | 23.9 | 37.8 | 15.4 | 2.46 | 65.4 | 2.7 | 131.2 | 5.5 |
| | 5-4 | 3 | 5 | 550 | 30 | 24.6 | 28.6 | 18.4 | 1.55 | 68.9 | 2.8 | 111.2 | 4.5 |
| | 5-5 | 3 | 5 | 600 | 30 | 36.4 | 19.3 | 24.1 | 0.80 | 112.1 | 3.1 | 131.2 | 3.6 |
| | 5-6 | 3 | 5 | 600 | 60 | 116.4 | 13.9 | 35.4 | 0.39 | 431.2 | 3.7 | 361.1 | 3.1 |

TABLE 21-continued

| | Reducing atmosphere conditions | | | | Average primary particle diameter [nm] | Si—OH bonds ratio [%] | Si—O bonds ratio [%] | Si—OH bonds/ Si—O bonds ratio | Dispersion state | | | |
|---|---|---|---|---|---|---|---|---|---|---|---|---|
| | | | | | | | | | Dispersion medium 1: Pure water | | Dispersion medium 2: Toluene | |
| | Hydrogen concen- tration [%] | Gas flow [L/min] | Treatment temperature [° C.] | Treatment time [min] | | | | | Dispersed particle diameter [nm] | Dispersed particle diameter/ Average primary particle diameter | Dispersed particle diameter [nm] | Dispersed particle diameter/ Average primary particle diameter |
| 5-7 | 3 | 5 | 600 | 90 | 236.4 | 6.7 | 43.9 | 0.15 | 896.3 | 3.8 | 461.2 | 2.0 |
| 5-8 | 3 | 5 | 650 | 60 | 346.2 | 2.3 | 68.4 | 0.03 | 1346.2 | 3.9 | 631.2 | 1.8 |

Figure 6:
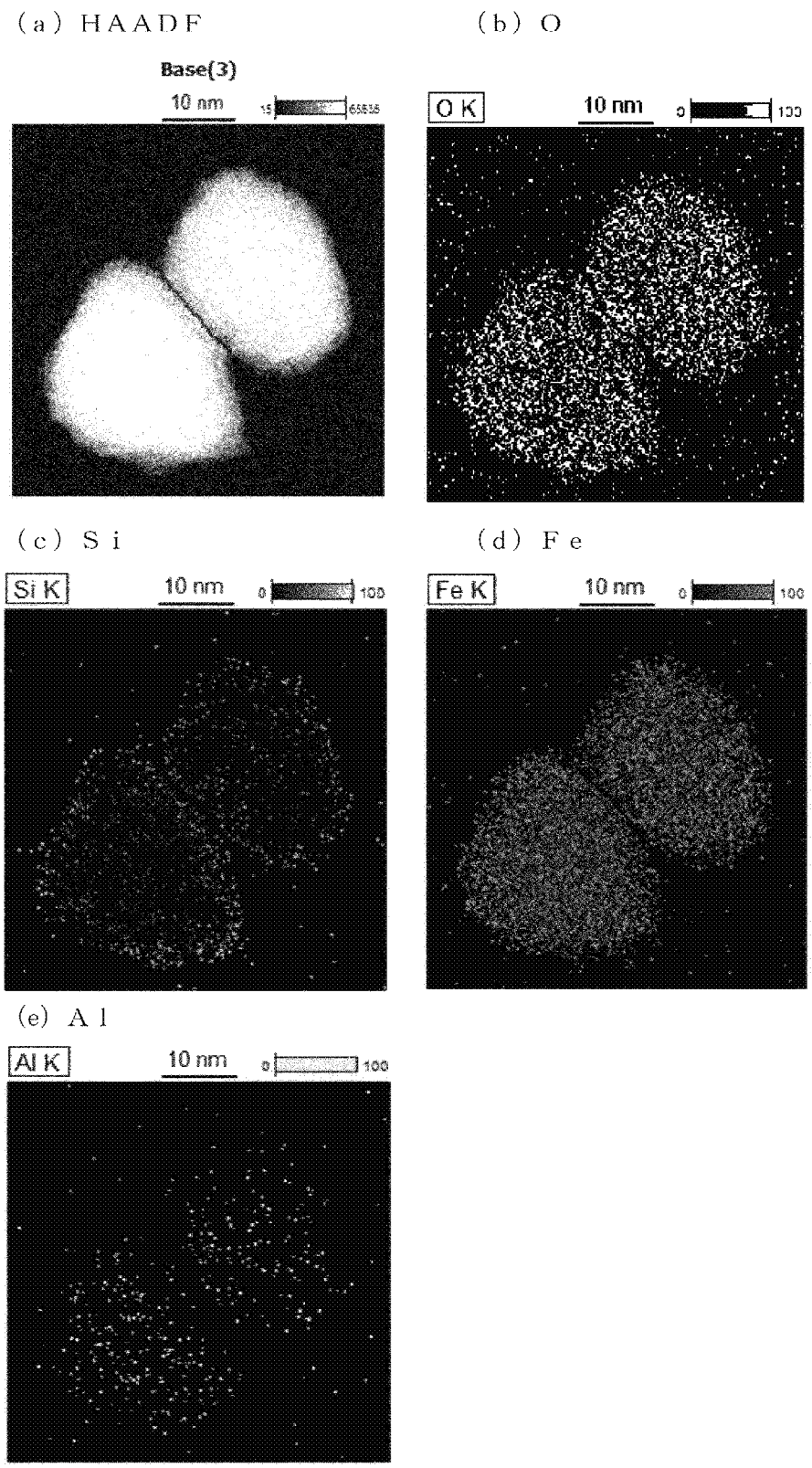
FIG. 6 is a diagram illustrating STEM mapping results of a silicon-compound-coated, silicon-aluminum-doped fine iron particle obtained in Example 5-5.

STEM mapping results for a silicon-compound-coated, silicon-aluminum-doped fine iron particle obtained in Example 5-5 are shown in FIG. 6. As is evident from FIG. 5, it can be understood that a surface of a silicon-aluminum-doped fine iron particle is coated with a silicon compound that contains a silicon oxide. Similar STEM mapping results were also obtained for Example 5-1 to Example 5-4 and Example 5-6 to Example 5-8. It was also confirmed that with increase of the treatment temperature or extension of the treatment time, the silicon contained in the silicon-aluminum-doped fine iron particle migrates toward a vicinity of a surface layer of the particle.

Figure 7:
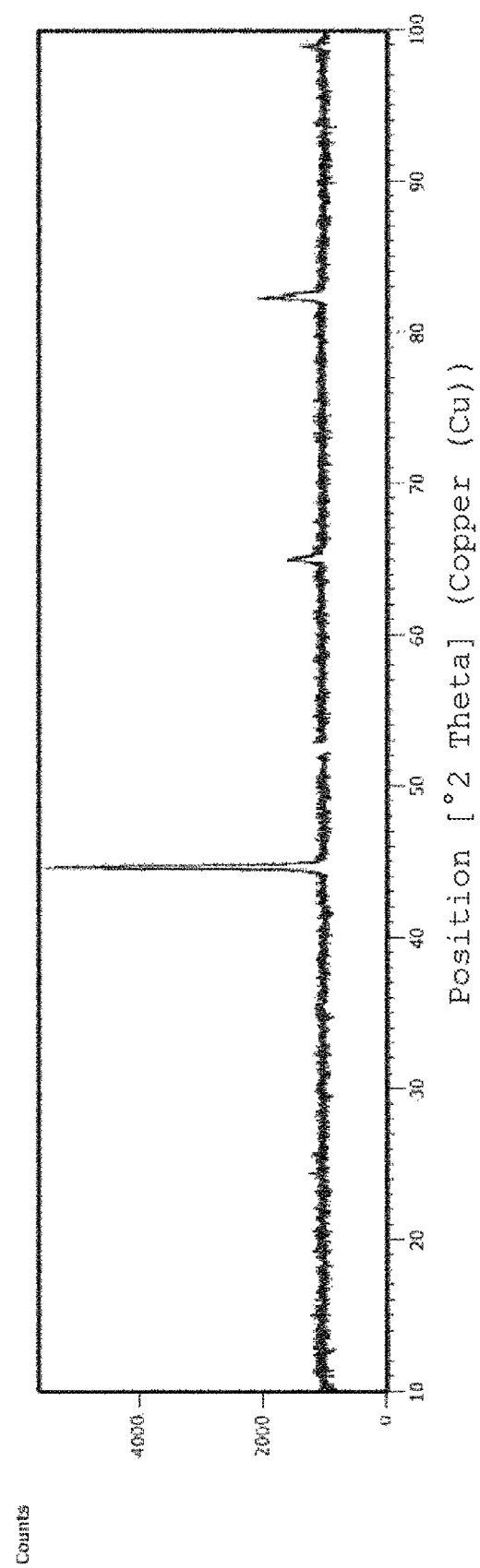
FIG. 7 is a diagram illustrating results of XRD measurement of the silicon-compound-coated, silicon-aluminum-doped fine iron particle obtained in Example 5-5.
Figure 8:
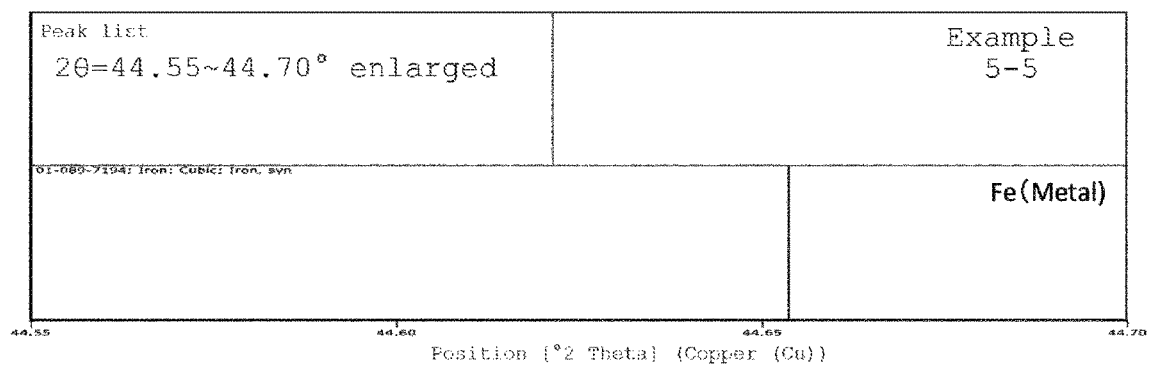
FIG. 8 is a diagram enlarging regions of the XRD measurement results of the silicon-compound-coated, silicon-aluminum-doped fine iron particle obtained in Example 5-5 in which peaks were seen to compare a peak list with peaks of Fe (metal) in a database.
Figure 8:
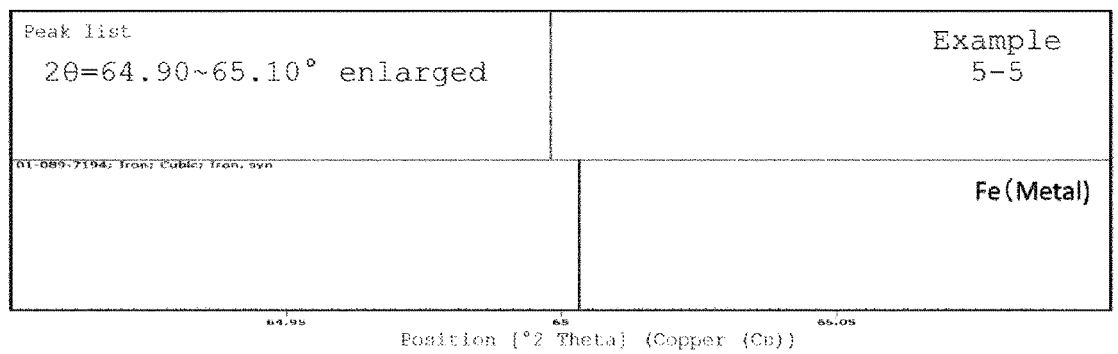
Figure 8:
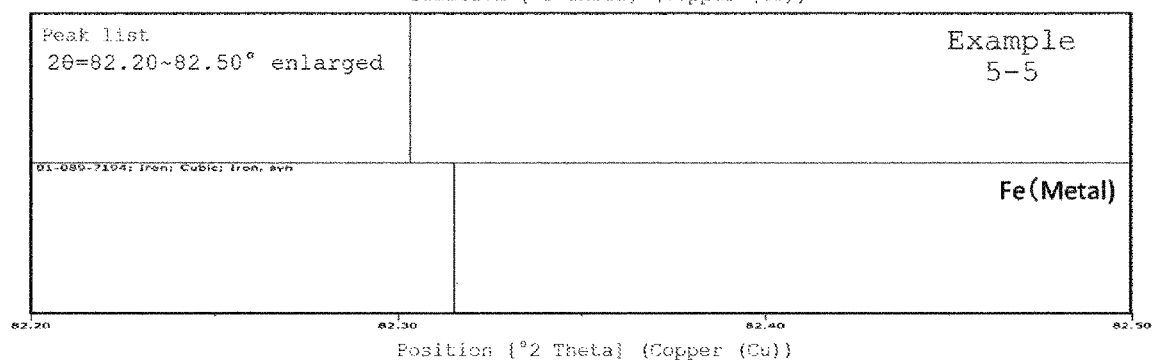

From XRD measurement results, whereas a peak of magnetite or other oxide was seen with the silicon-compound-coated, silicon-aluminum-doped fine iron particles obtained under the conditions of each of Example 5-1 to Example 5-3, an oxide peak was not seen and a peak close to a peak of only iron was seen with the silicon-aluminum-doped iron particles obtained in Example 5-4 to Example 5-8. As a representative, the measurement results for Example 5-5 are shown in FIG. 7. In FIG. 8, peak positions of iron (Fe: metal) in a database are shown with respect to a peak list of the measurement results shown in FIG. 7 with the vicinities of the respective peaks being enlarged. As is evident from FIG. 8, it can be understood that the XRD measurement results for the silicon-aluminum-doped fine iron particles obtained in Example 5-5 indicate peaks being close to those of iron but shifted in peak position with respect to those of iron itself. It is considered that the above XRD measurement results were obtained due to the silicon-aluminum-doped fine iron particle being that with which iron, silicon, and aluminum form a solid solution.

As is evident from Table 21, it was found that silicon-compound-coated metal particles are obtained by treating silicon-compound-coated fine precursor particles in a reducing atmosphere and that the dispersibility of the silicon-compound-coated fine metal particles can be controlled by controlling the Si—OH bonds/Si—O bonds ratio contained in the silicon-compound-coated fine metal particles as well.

The invention claimed is:

1. Silicon-compound-coated fine metal particles, wherein surfaces of fine metal particles, composed of at least one type of metal element or metalloid element, are at least partially coated with a silicon compound and a ratio of Si—OH bonds contained in the silicon-compound-coated fine metal particles is controlled to be 0.1% or more and 70% or less, or
a ratio of Si—OH bonds/Si—O bonds that is a ratio of Si—OH bonds to a ratio of Si—O bonds contained in the silicon-compound-coated fine metal particles is controlled to be 0.001 or more and 700 or less,
wherein the ratio of Si—OH bonds or the ratio of Si—OH bonds/Si—O bonds is that obtained by waveform separation of peaks in a wavenumber region of 750 cm$^{-1}$ to 1300 cm$^{-1}$ in an infrared absorption spectrum of the silicon-compound-coated fine metal particles measured using an attenuated total reflection method (ATR method).

2. The silicon-compound-coated fine metal particles according to claim 1, wherein the ratio of Si—OH bonds or the ratio of Si—OH bonds/Si—O bonds contained in the silicon-compound-coated fine metal particles is controlled by a functional group changing treatment.

3. The silicon-compound-coated fine metal particles according to claim 2, wherein the functional group changing treatment is at least one type of reaction selected from among a substitution reaction, an addition reaction, an elimination reaction, a dehydration reaction, a condensation reaction, a reduction reaction, and an oxidation reaction.

4. The silicon-compound-coated fine metal particles according to claim 1, wherein the silicon-compound-coated fine metal particles are those with which surfaces of single fine metal particles are at least partially coated with a silicon compound, a primary particle diameter of the fine metal particles is 1 μm or less, and a primary particle diameter of the silicon-compound-coated fine metal particles is 100.5% or more and 190% or less of the primary particle diameter of the fine metal particles.

5. The silicon-compound-coated fine metal particles according to claim 4, wherein the silicon-compound-coated fine metal particles are core-shell type silicon-compound-coated fine metal particles, with each of which an entire surface of a single fine metal particle serving as a core is coated with a silicon compound serving as a shell.

6. The silicon-compound-coated fine metal particles according to claim 1, wherein the silicon-compound-coated fine metal particles are those with which surfaces of aggregates, each formed by aggregation of a plurality of fine metal particles, are at least partially coated with a silicon compound, a diameter of the aggregates is 1 μm or less, and a particle diameter of the silicon-compound-coated fine metal particles is 100.5% or more and 190% or less of the diameter of the aggregates.

7. The silicon-compound-coated fine metal particles according to claim 1, wherein the metal element or metalloid element includes at least one type of element selected from a group consisting of silver, copper, and nickel.

8. The silicon-compound-coated fine metal particles according to claim 1, wherein the Si—OH bonds are attributed to a peak of greatest area ratio among waveform-separated Si—OH-bond-derived peaks in a wavenumber region of 850 cm$^{-1}$ to 980 cm$^{-1}$ obtained by waveform separation of peaks in a wavenumber region of 750 cm$^{-1}$ to 1300 cm$^{-1}$ in an infrared absorption spectrum of the silicon-compound-coated fine metal particles measured using an attenuated total reflection method (ATR method), and the ratio of Si—OH bonds is a ratio of an area of the peak attributed to the Si—OH bonds to a total area of peaks obtained by waveform separation of peaks in the wavenumber region of 750 cm$^{-1}$ to 1300 cm$^{-1}$.

9. The silicon-compound-coated fine metal particles according to claim 1, wherein the Si—O bonds are attributed to a peak of greatest area ratio among waveform-separated Si—O-bond-derived peaks in a wavenumber region of 1000 cm$^{-1}$ or more and 1300 cm$^{-1}$ or less obtained by waveform separation of peaks in a wavenumber region of 750 cm$^{-1}$ to 1300 cm$^{-1}$ in an infrared absorption spectrum of the silicon-compound-coated fine metal particles measured using an attenuated total reflection method (ATR method), the Si—OH bonds are attributed to a peak of greatest area ratio among Si—OH-bond-derived peaks in the wavenumber region of 850 cm$^{-1}$ to 980 cm$^{-1}$ obtained by waveform separation of peaks in a wavenumber region of 750 cm$^{-1}$ to 1300 cm$^{-1}$ in an infrared absorption spectrum of the silicon-compound-coated fine metal particles measured using an attenuated total reflection method (ATR method), and the ratio of Si—OH bonds/Si—O bonds is the ratio of an area of the peak attributed to the Si—OH bonds to an area of the peak attributed to the Si—O bonds.

10. The silicon-compound-coated fine metal particles according to claim 1, wherein the silicon-compound-coated fine metal particles are those obtained by fine metal particles being precipitated and a silicon compound being coated on the surfaces of the fine metal particles continuously subsequent to the precipitation between processing surfaces that are capable of approaching and separating from each other and rotate relative to each other.

11. The silicon-compound-coated fine metal particles according to claim 1, wherein the silicon-compound-coated fine metal particles are silicon-compound-coated fine metal particles, with which silicon is contained in interiors of the fine metal particles at least before a heat treatment is applied and, by application of the heat treatment, the silicon is migrated from the interior toward an outer circumference of each fine metal particle in comparison to before application of the heat treatment.

12. The silicon-compound-coated fine metal particles according to claim 1, wherein dispersibility of the silicon-compound-coated fine metal particles in a solvent is controlled
   by the ratio of the Si—OH bonds being controlled to be 0.1% or more and 70% or less or the ratio of Si—OH bonds/Si—O bonds being controlled to be 0.001 or more and 700 or less.

13. A coating composition, a composition for transparent material, a magnetic composition, a conductive composition, a coloring composition, a reaction composition, or a catalyst composition that contains the silicon-compound-coated fine metal particles according to claim 1.

* * * * *